United States Patent
Hosotsubo

(10) Patent No.: US 12,304,127 B2
(45) Date of Patent: May 20, 2025

(54) INJECTION MOLDING MACHINE AND INSPECTION METHOD OF INJECTION MOLDING MACHINE

(71) Applicant: Sodick Co., Ltd., Kanagawa (JP)

(72) Inventor: Yoshitaka Hosotsubo, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 9 days.

(21) Appl. No.: 17/678,007

(22) Filed: Feb. 23, 2022

(65) Prior Publication Data

US 2022/0266491 A1 Aug. 25, 2022

(30) Foreign Application Priority Data

Feb. 24, 2021 (JP) .................................. 2021-027192

(51) Int. Cl.
*B29C 45/76* (2006.01)

(52) U.S. Cl.
CPC .................................. *B29C 45/768* (2013.01)

(58) Field of Classification Search
CPC ....... B29C 45/768; B29C 45/76; B29C 45/77; B29C 2945/76006; B29C 2945/76224; B29C 2945/76943
See application file for complete search history.

(56) References Cited

U.S. PATENT DOCUMENTS

| 6,093,361 A | * | 7/2000 | Schad | B29C 45/68 425/589 |
| 6,468,449 B1 | * | 10/2002 | Fujikawa | B29C 45/6714 425/150 |
| 2009/0214688 A1 | | 8/2009 | Hakoda et al. | |
| 2023/0135319 A1 | * | 5/2023 | Nagano | F16K 11/07 60/327 |

FOREIGN PATENT DOCUMENTS

| EP | 3381647 A1 | * | 10/2018 | ........... B29C 45/768 |
| JP | H05111935 A | * | 5/1993 | |
| JP | 2680431 | | 11/1997 | |
| JP | 2934083 | | 8/1999 | |
| JP | 2009202366 | | 9/2009 | |
| JP | 2016215254 | | 12/2016 | |

\* cited by examiner

*Primary Examiner* — John J DeRusso
*Assistant Examiner* — Victoria Bartlett
(74) *Attorney, Agent, or Firm* — JCIPRNET

(57) ABSTRACT

An injection molding machine and an inspection method of an injection molding machine are provided. In the injection molding machine, a control device includes a storage part which stores an inspection program indicating an operation of the injection molding machine, a control part which executes the inspection program, a detection part which acquires, as a detection data, a state of the injection molding machine when the injection molding machine is driven according to the inspection program, and a determination part which identifies a deteriorated spot of the injection molding machine based on the detection data. The detection part acquires at least two types or more of the detection data, and the determination part identifies the deteriorated spot based on a plurality of types of the detection data.

9 Claims, 18 Drawing Sheets

INJECTION MOLDING MACHINE AND INSPECTION METHOD OF INJECTION MOLDING MACHINE

CROSS-REFERENCE TO RELATED APPLICATION

This application claims the priority benefit of Japan application serial no. 2021-027192, filed on Feb. 24, 2021. The entirety of the above-mentioned patent application is hereby incorporated by reference herein and made a part of this specification.

BACKGROUND

Technical Field

The disclosure relates to an injection molding machine and an inspection method of an injection molding machine.

Related Art

An injection molding machine is composed of a mold clamping device, an injection device, and a control device for operating and controlling the mold clamping device and the injection device, and performs molding by injecting a material which is plasticized and melted while heated into a mold, and then cooling and solidifying the material. The mold clamping device opens and closes the mounted mold and performs mold clamping, and the injection device injects a metered molding material into the clamped mold through an injection nozzle abutting against the mold. The injection molding machine repeats a molding cycle by continuously driving the mold clamping device and the injection device to continuously produce products.

When injection molding is repeatedly performed in this manner, aging deterioration such as wearing of machine components and loosening of components may occur, resulting in molding defects. Therefore, conventionally, a function has been developed so that a deteriorated spot of an injection molding machine can be easily detected.

Patent Document 1 (Japanese Patent No. 2680431) discloses an invention relating to an inspection monitoring method of an injection molding machine. In Patent Document 1, after a metering operation is ended, an injection port at a barrel tip end part is closed and an injection operation is performed at a predetermined speed, and a pressure increase time until reaching a predetermined pressure value is measured and stored as a comparison reference value. The same operation is performed at the time of inspection to measure a pressure increase time, and when the measured pressure increase time is out of an allowable range centered on the comparison reference value, an alarm is activated.

Patent Document 2 (Japanese Patent No. 2934083) discloses an invention relating to an inspection method of an injection molding machine. In Patent Document 2, at the time of shipment, a driving current of a motor that drives each movable part of the injection molding machine when each movable part is driven in a no-load state is measured in advance to obtain an allowable value. At the time of inspection, the same operation is performed to detect a driving current of the motor. According to whether the detected driving current value is within a range of the allowable value, a deterioration state of a force transmission system of each movable part is determined.

The injection molding machine is composed of a plurality of devices such as a mold clamping device, an injection device, and a control device. Since molding is performed using a large number of components, the inside of the machine is very complicated. When a molding defect occurs in a product, it is very difficult to identify the part causing the defect, and high-level skills are required. It is not easy for an inexperienced person to determine which component should be replaced or adjusted.

Furthermore, in order to identify the component that causes the molding defect, rather than performing determination based on one type of measurement data as in the inspection method of Patent Document 1 and Patent Document 2, comprehensive determination based on a plurality of measurement data improves the accuracy of identifying the part, and it is possible to reduce a number of times of dispatching a serviceman and a number of times of disassembling the injection molding machine.

SUMMARY

An injection molding machine according to an embodiment of the disclosure includes a mold clamping device, an injection device, and a control device. The control device includes a storage part, a control part, a detection part, and a determination part. The storage part stores an inspection program indicating an operation of the injection molding machine. The control part executes the inspection program. The detection part acquires, as a detection data, a state of the injection molding machine when the injection molding machine is driven according to the inspection program. The determination part identifies a deteriorated spot of the injection molding machine based on the detection data. The detection part acquires at least two types or more of the detection data, and the determination part identifies the deteriorated spot based on a plurality of types of the detection data.

Further, an inspection method of an injection molding machine according to an embodiment of the disclosure is an inspection method of an injection molding machine including a mold clamping device, an injection device, and a control device. The inspection method includes the following steps. In an inspection program execution step, the injection molding machine is driven according to an inspection program. In a storage step, at least two types or more of a state of the injection molding machine when the injection molding machine is driven according to the inspection program are acquired and stored as a detection data. In a determination step, a deteriorated spot is identified based on a plurality of types of the detection data.

Further, the inspection program according to an embodiment of the disclosure includes a metering purge operation program which combines metering and purging in the injection device, and the detection data includes a resin pressure applied to an injection plunger and a spool monitor value of an injection plunger driving device.

Further, the inspection program according to an embodiment of the disclosure includes a mold thickness adjustment operation program which adjusts a position of mold clamping of the mold clamping device, and the detection data includes a position of a mold clamping ram of the mold clamping device and a pump pressure of a hydraulic pump for driving the mold clamping ram.

According to the disclosure, since identification of a deteriorated spot is performed based on a plurality of types of the detection data such as a spool monitor value, a resin pressure, a position of the mold clamping ram, a pump pressure, etc. simply by executing the inspection program from the setting screen or the like, even an operator who is unfamiliar with the operation can perform a diagnosis with high accuracy without wasting time and effort.

In an embodiment of the disclosure, the storage part stores a plurality of types of the inspection program, and the control part continuously executes the plurality of types of the inspection program in combination.

According to the disclosure, since a plurality of inspection programs can be combined and automatically executed, it is possible to quickly identify a defective part even in the case of an injection molding machine which has a very complicated inside of the machine.

In an embodiment of the disclosure, the detection part acquires, as a reference data, a state of the injection molding machine when the injection molding machine is driven according to the inspection program at the time of shipment, periodic inspection, or replacement of consumables, and the determination part compares the reference data and the detection data to identify the deteriorated spot.

According to the disclosure, since the detection part acquires, as a reference data, a state of the injection molding machine when the injection molding machine is driven according to the inspection program at the time of shipment, periodic inspection, or replacement of consumables, even if the reference value for identifying the deteriorated spot slightly deviates depending on each device, diagnosis can be performed with higher accuracy.

In the injection molding machine and the inspection method of an injection molding machine of the disclosure, since the operator acquires the machine status from the injection molding machine and identifies the deteriorated spot simply by executing the inspection program from the setting screen or the like, even an operator who is unfamiliar with the operation can identify the deteriorated spot without wasting time and effort, and it is possible to further perform diagnosis with high accuracy.

Furthermore, since the deteriorated spot is identified based on a plurality of types of the detection data, it is possible to perform diagnosis with high accuracy.

BRIEF DESCRIPTION OF THE DRAWINGS

FIG. 7 shows a case in which the annular convex parts 31a do not block the detection optical axis B.

FIG. 8 shows a case in which the annular convex parts 31a block the detection optical axis B.

DESCRIPTION OF THE EMBODIMENTS

Embodiments of the disclosure provide an injection molding machine and an inspection method of an injection molding machine in which even an inexperienced person can quickly and easily detect a deteriorated spot or a maintenance part of an injection molding machine, and a part causing a molding defect can be further identified with high accuracy. Hereinafter, the embodiments of the disclosure will be described with reference to the drawings.

(1.1 Configuration of Injection Molding Machine 100)

Figure 1:
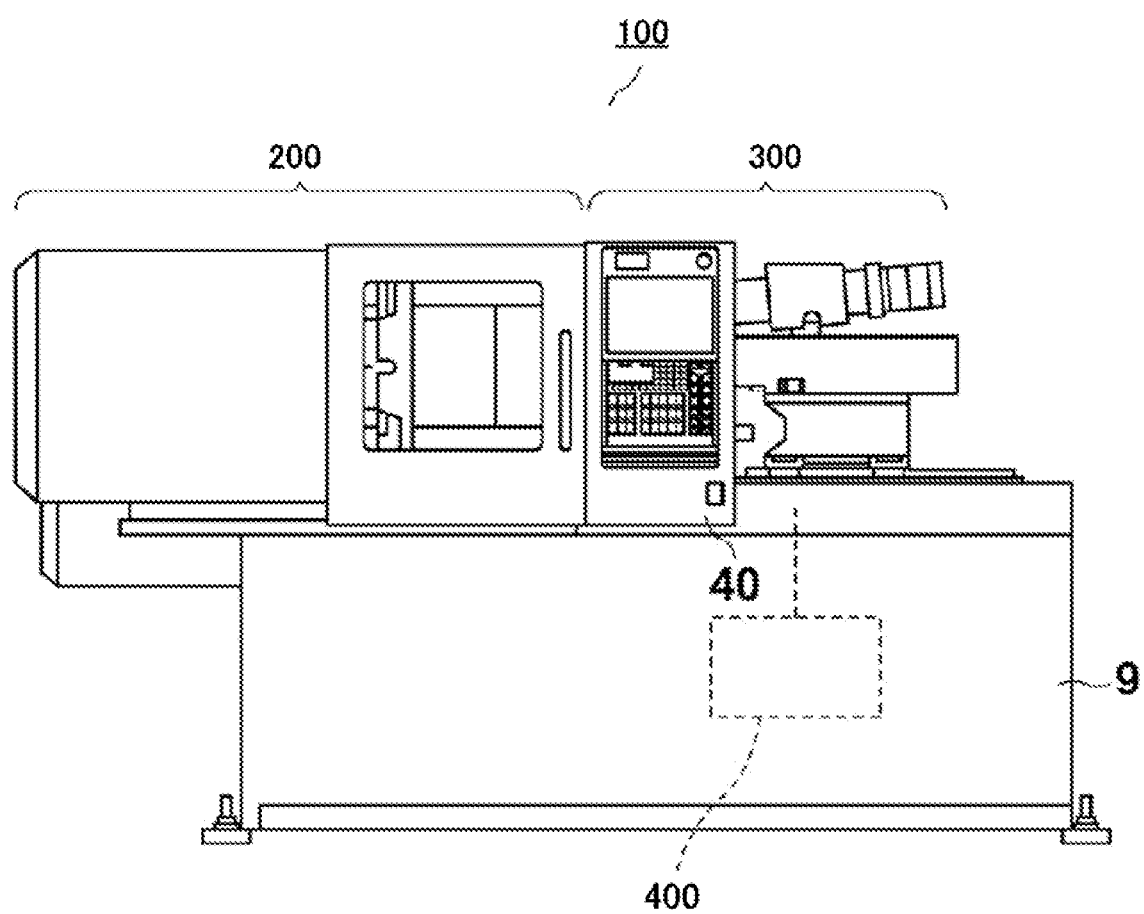
FIG. 1 is a schematic configuration view of an injection molding machine 100 according to an embodiment of the disclosure.

Hereinafter, embodiments of the disclosure will be described with reference to the drawings. FIG. 1 is a schematic configuration view of an injection molding machine 100 of the disclosure. In the injection molding machine 100 of the disclosure, a mold clamping device 200 and an injection device 300 are arranged on a machine base 9, a main body of a control device 400 is further provided in the machine base 9, and an operation panel unit 40 of the control device 400 is provided between the mold clamping device 200 and the injection device 300. Further, the main body of the control device 400 may also be provided in the operation panel unit 40.

The mold clamping device 200 has a mechanism of opening and closing a mold 6 and is configured to apply a sufficient pressure (mold clamping force) when the mold 6 is filled with a resin material. By applying a mold clamping force, it is possible to withstand the pressure when the melted resin material enters the mold 6, so that the resin material does not come out from the mold 6. On the other hand, the injection device 300 plasticizes and melts the resin material while heating it, the molten resin is injected at a high pressure to fill a cavity space 6c in the mold 6 mounted on the mold clamping device 200, and the molten resin in the cavity space 6*c* is cooled and solidified to obtain a molded product.

A display part (display device) 48 and an input part 49 for performing operations are provided on a front surface of the operation panel unit 40. The display part 48 is composed of, for example, a display device such as a liquid crystal display and displays a setting screen or the like. The input part 49 is, for example, an input device such as a keyboard, an operation panel, and a touch panel provided to overlap on a display surface of the display part.

(1.2 Configuration of Mold Clamping Device 200)

Figure 2:
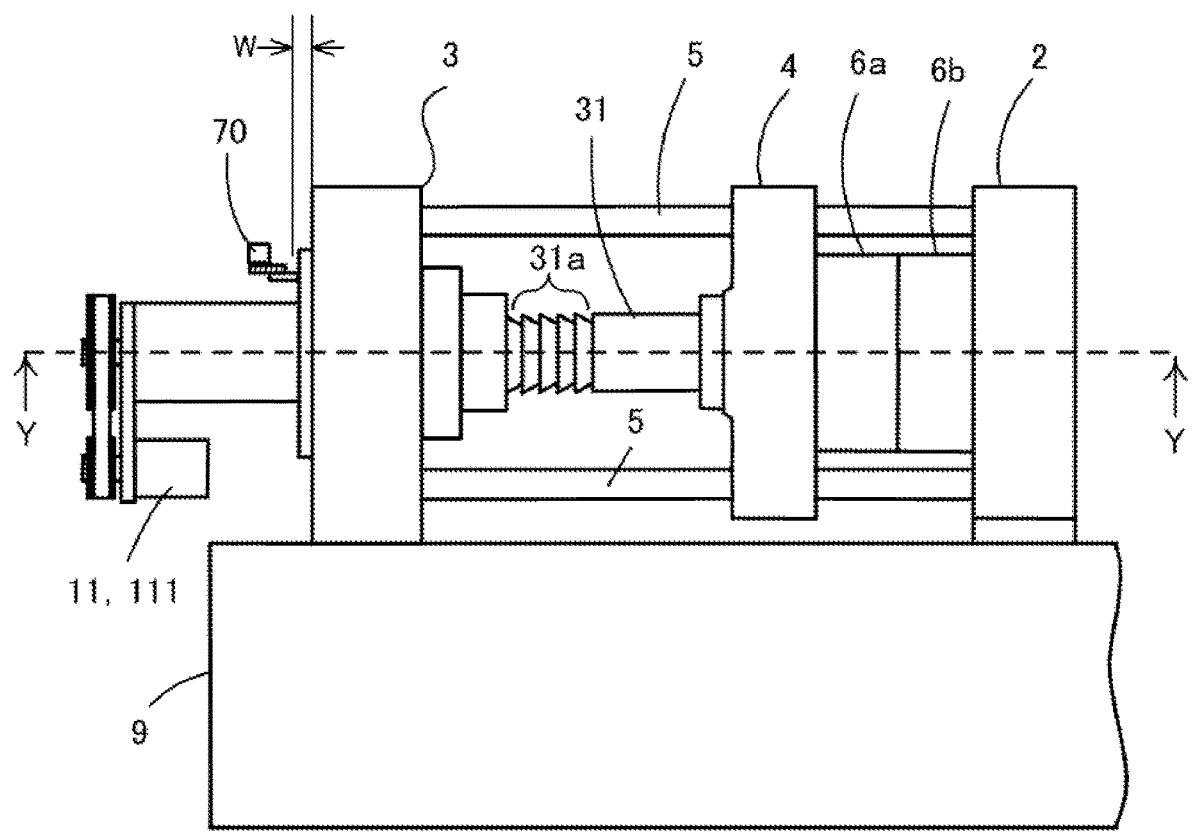
FIG. 2 is an overall schematic side view showing a mold clamping device 200 of the above embodiment.
Figure 3:
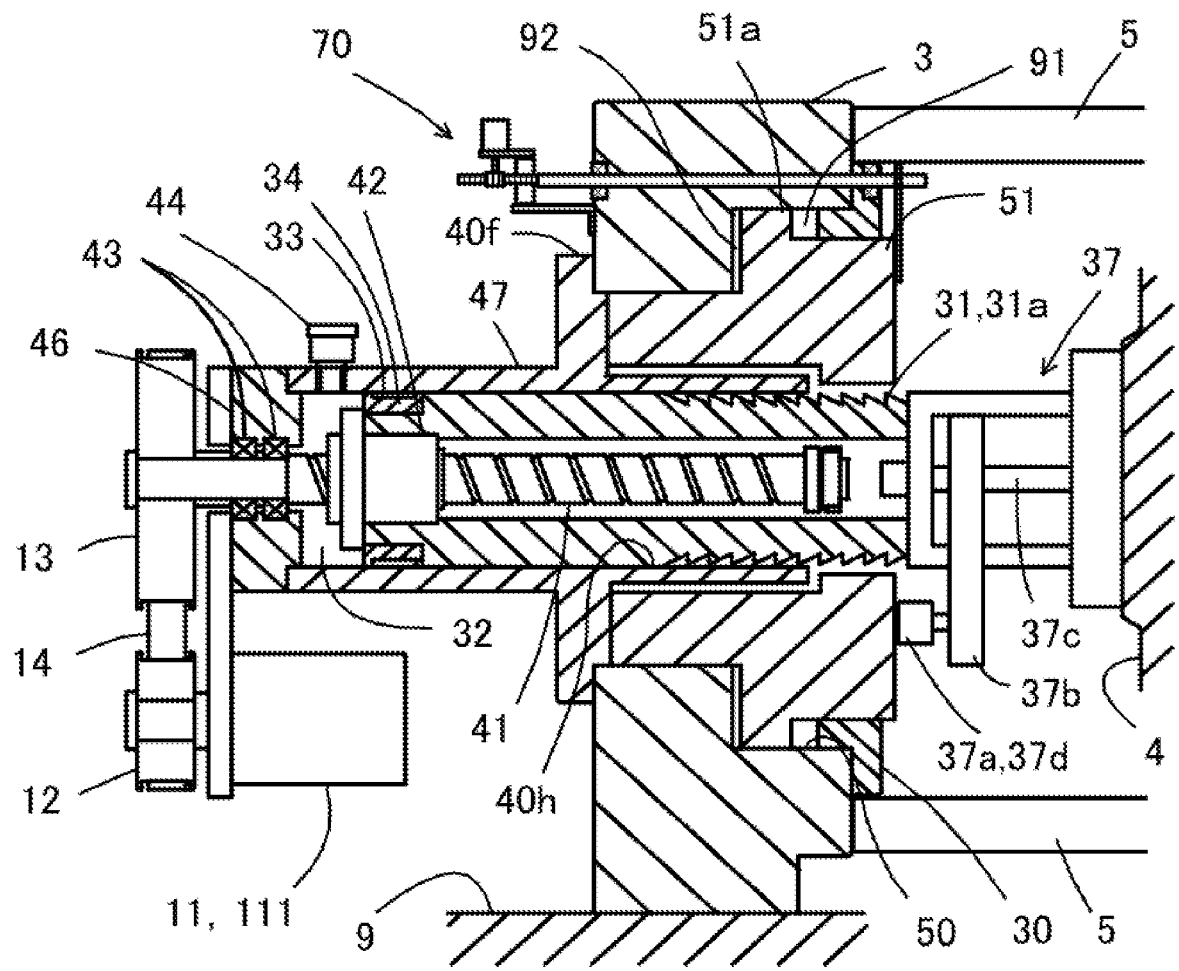
FIG. 3 is a side sectional view showing a main part behind a movable platen 4 of the mold clamping device 200 of the above embodiment.
Figure 4:
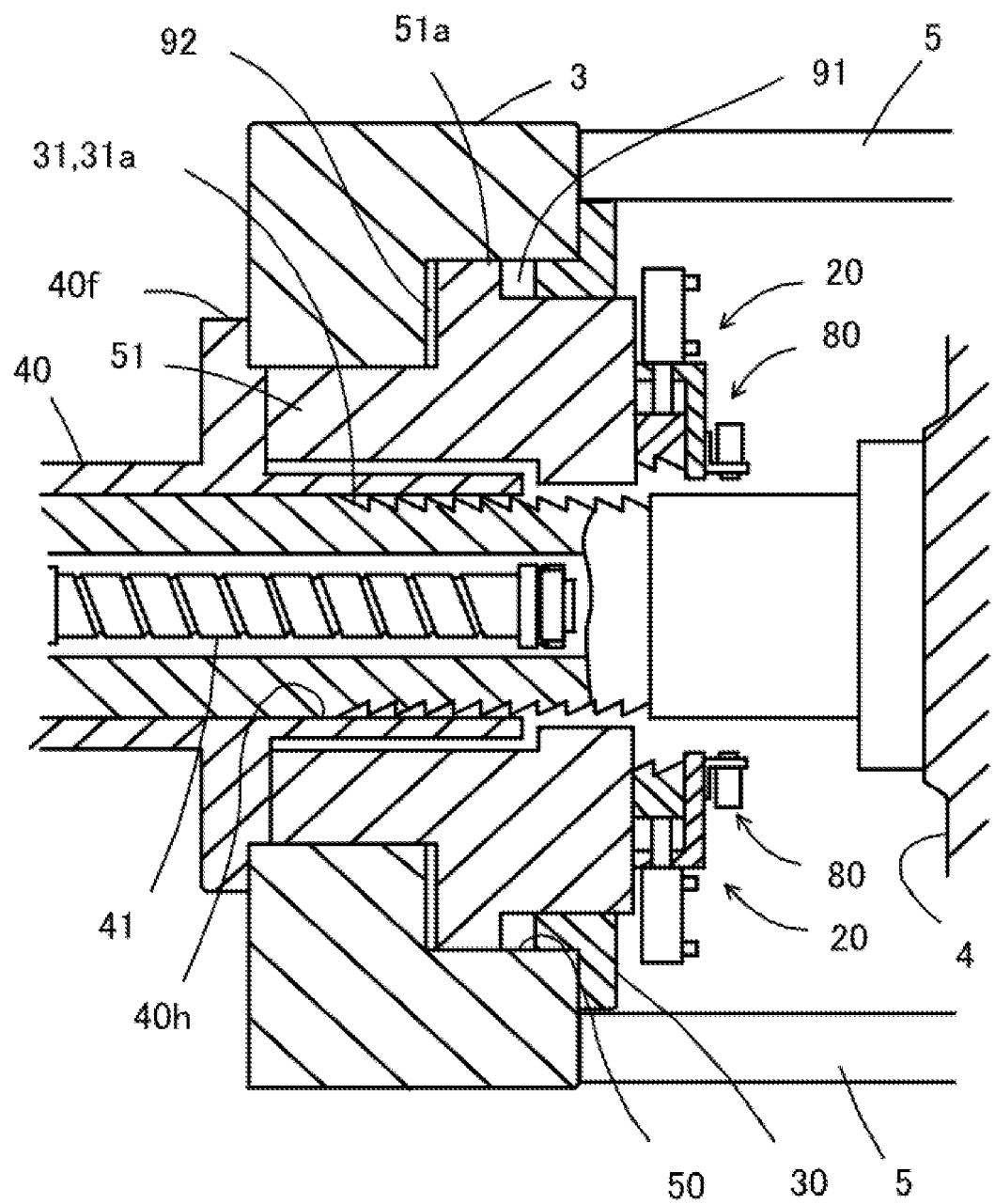
FIG. 4 is a cross-sectional view taken along line Y-Y showing a structure of a half nut device 20 of the mold clamping device 200 of the above embodiment and its vicinity.

FIG. 2 is an overall schematic side view showing the mold clamping device 200 of the above embodiment, and FIG. 3 is a side sectional view showing a main part behind a movable platen 4 of the mold clamping device 200 of the above embodiment. FIG. 4 is a cross-sectional view taken along line Y-Y showing a structure of a half nut device 20 of the mold clamping device 200 of the above embodiment and its vicinity.

Herein, in this specification, a movement direction of a mold clamping ram 51 is a front-rear direction, a direction in which the mold clamping ram 51 moves toward a fixed platen 2 is a front side, and the opposite direction is a rear side. Further, a direction from the mold clamping ram 51 to the fixed platen 2 is a positive direction, and the opposite direction is a negative direction.

The mold clamping device 200 includes a fixed platen 2 fixed to the machine base 9 and a support platen 3 slidable on the machine base 9, and movably supports a movable platen 4 along tie bars 5, 5, 5, and 5 passed between the fixed platen 2 and the support platen 3. A fixed-side mold 6*b* is attached to the fixed platen 2, and a movable-side mold 6*a* is attached to the movable platen 4. The movable platen 4 advances with respect to the fixed platen 2 to close the mold, retreats to open the mold, and after mold closing, the movable platen 4 is further pressed to the fixed platen 2 to perform mold clamping.

A servomotor 11 fixed to the support platen 3 rotates a mold opening/closing screw shaft 41 to be described later, so that a mold clamping shaft 31 advances the movable platen 4 toward the fixed platen 2 to perform mold closing. Then, the mold clamping ram 51 built in the support platen 3 presses the movable platen 4 to a fixed platen 2 side via the half nut device 20 attached to a tip end of the mold clamping ram 51 to perform mold clamping (FIG. 4). Herein, the mold clamping shaft 31, the half nut device 20, and the mold clamping ram 51 are coaxially arranged.

Next, the movable platen 4 retreats to perform mold opening. At the time of mold clamping, conventionally, the tie bars 5 extend and the support platen 3 retreats by a mold clamping allowance W corresponding to the mold clamping force. The support platen 3 is provided with a ram position detection member 70 to be described later, and the half nut device 20 is provided with a photoelectric detector 80.

As shown in FIG. 3, a back-surface support member 47 having a bulging part that bulges in a cylindrical shape in the front-rear direction is fixed to a rear surface of the support platen 3 by a flange part 40*f*. An inner cylinder surface 40*h* is formed on an inside thereof through the bulging part bulging in the front-rear direction. A pair of bearings 43 are housed in a rear end member 46 that closes a rear end of the back-surface support member 47, and the mold opening/closing screw shaft 41 is pivotally supported by the bearings 43. A ball screw is formed on an outer periphery of most of the mold opening/closing screw shaft 41, and a pulley 13 is fixed to a shaft head at a rear end thereof. The servomotor 11 is fixed to a motor base attached to the rear end member 46, and a pulley 12 is fixed to an output shaft of the servomotor 11. A timing belt 14 is stretched between the pulley 12 and the pulley 13. An encoder 111 is built in the servomotor 11, and thereby a position of the movable platen 4 in the front-rear direction is detected and a mold opening/closing operation is controlled.

The mold clamping shaft 31 is fixed to a rear surface of the movable platen 4 so that the axial centers thereof coincide with each other, and annular convex parts 31*a* each having a triangular cross section is formed at a constant pitch on an outer circumference of the mold clamping shaft 31. Further, a hollow hole is formed along the axial center of the mold clamping shaft 31, and a mold opening/closing nut 42 is fixed to a rear end thereof. The mold opening/closing nut 42 is a ball nut and is screwed onto the mold opening/closing screw shaft 41. Accordingly, a mold opening/closing mechanism is configured so that the mold opening/closing screw shaft 41 is coaxially and compactly housed in the hollow hole of the mold clamping shaft 31, and the mold clamping shaft 31 moves as the mold opening/closing screw shaft 41 rotates.

Further, a rear end member 33 is integrally attached to a rear end of the mold clamping shaft 31, and a slide bearing bush 34 is fitted therein. The rear end member 33 is movably housed in the inner cylinder surface 40*h* of the back-surface support member 47. Accordingly, at the time of mold opening and closing, the mold clamping shaft 31 is guided by the inner cylinder surface 40*h* of the back-surface support member 47 and moves. Further, a predetermined amount of lubricating oil is stored in a vacant chamber 32 surrounded by the inner cylinder surface 40*h* of the back-surface support member 47, the rear end member 46, the rear end member 33 of the mold clamping shaft 31, and the mold opening/closing nut 42. An air breather 44 is attached to a through hole formed in the back-surface support member 47 above this space, and when a volume of the vacant chamber 32 changes due to mold opening and closing, the air in the vacant chamber 32 goes in and out via the air breather 44. Accordingly, an oil bath lubrication method is adopted so that the frictional resistance is reduced when the slide bearing bush 34 of the mold clamping shaft 31 slides.

An eject mechanism 37 for taking out a molded product is provided at a front end of the mold clamping shaft 31.

The eject mechanism 37 is a means for automatically taking out the molded product from the mold 6, includes a servomotor 37*a* for protrusion, and, when a pair of molds 6 are opened at the time of mold opening, drives the servomotor 37*a*, and operates a protrusion shaft 37*c* with a timing belt 37*b*, which is a transmission mechanism, interposed therebetween, to protrude and drop the molded product in the movable-side mold 6*a* in a downward direction. An encoder 37*d* is built in the servomotor 37*a*, and thereby a position of the protrusion shaft 37*c* in the front-rear direction is detected.

A mold clamping cylinder hole 50 is formed in the support platen 3, and the mold clamping ram 51 is housed in the mold clamping cylinder hole 50 to be able to advance and retreat. A front-surface support member 30 closes the mold clamping cylinder hole 50 by liquid sealing and supports the mold clamping ram 51 in a liquid sealed state. A mold opening oil chamber 91 and a mold clamping oil chamber 92 are formed in front of and behind a piston part 51*a* of the mold clamping ram 51, and a pressure oil is supplied by a ram position control member 90 to be described later.

Figure 5:
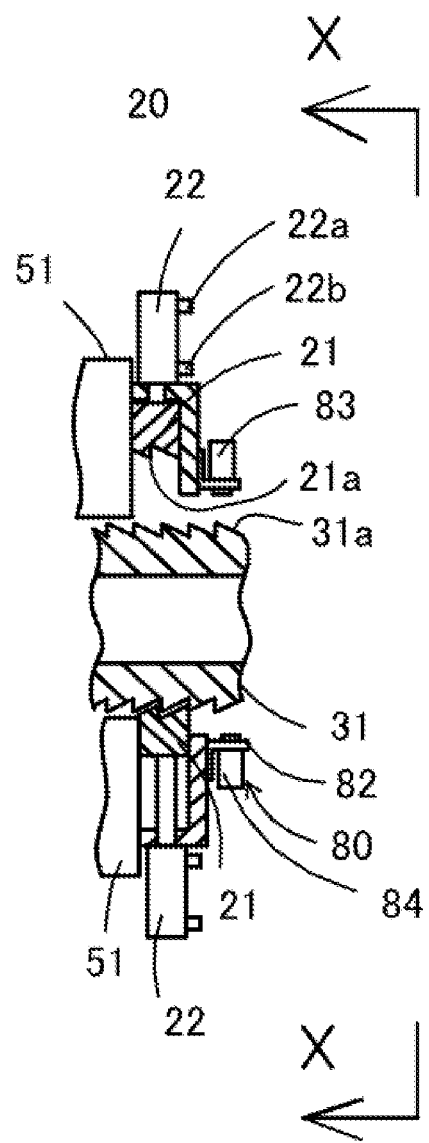
FIG. 5 is an enlarged view showing the half nut device 20 of the above embodiment.
Figure 6:
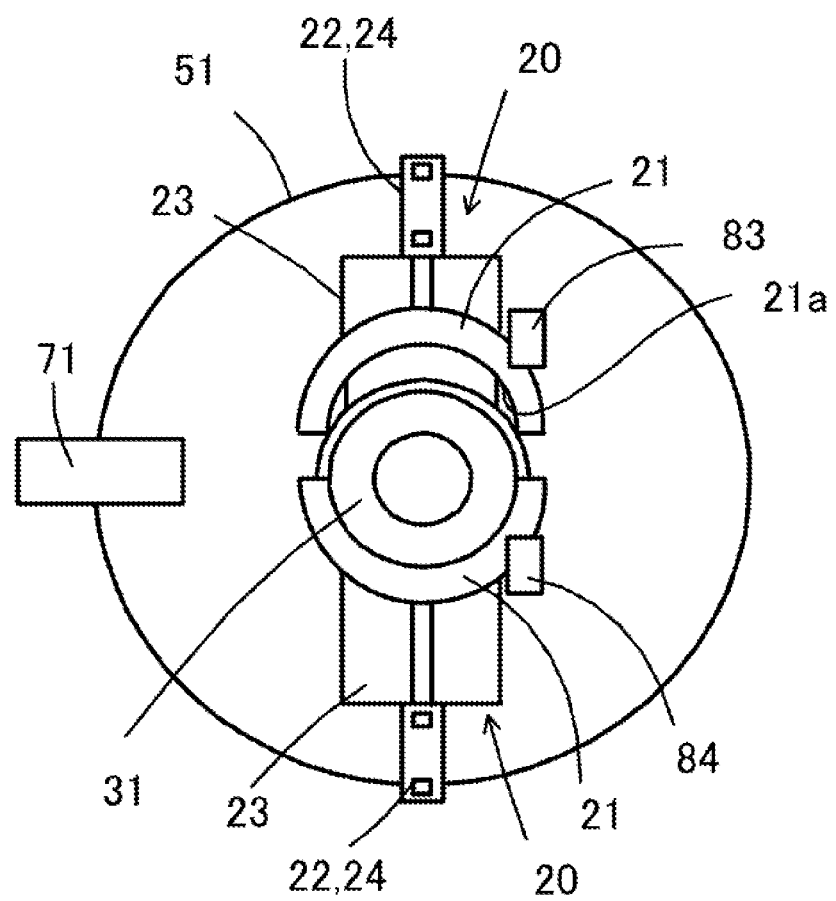
FIG. 6 is an X-X arrow view of FIG. 5 showing the half nut device 20 of the above embodiment.

FIG. 5 is an enlarged view showing the half nut device 20 of the above embodiment, and FIG. 6 is an X-X arrow view of FIG. 5 showing the half nut device 20 of the above embodiment.

The half nut device 20 is attached so that a center thereof coincides with a shaft center of the mold clamping shaft 31, and half nuts 21 and 21 are housed on two sides of the mold clamping shaft 31 to be guided by a guide rail 23. An air valve 24 and air cylinders 22 and 22 are provided so that the half nuts 21 advance and retreat with respect to the mold clamping shaft 31, and rods thereof are coupled to the half nuts 21 and 21. The air cylinder 22 is attached with an engagement sensor 22b which detects that the half nut 21 has advanced and engaged with the mold clamping shaft 31, and an engagement sensor 22a which detects that the half nut 21 has retreated and engagement with the mold clamping shaft 31 has been released. To facilitate understanding, the half nut 21 shown on an upper side on the paper surface indicates a retreated state, and the half nut 21 shown on a lower side on the paper surface indicates an advanced state. Of course, before and after the mold clamping operation, the half nuts 21 advance and retreat with respect to the mold clamping shaft 31 at the same time.

Teeth 21a which engage with the annular convex parts 31a of the mold clamping shaft 31 described above are formed on an end surface of the half nut 21 facing the mold clamping shaft 31. The teeth 21a are formed over substantially a semi-circumference to in contact and engage with the annular convex parts 31a in an area as large as possible. Since one mold clamping ram 51 presses one mold clamping shaft 31 coaxially with the mold clamping device 200 via one set of the half nuts 21 to perform mold clamping, the mold clamping force is accurately and evenly applied to the movable platen 4.

Further, the mold clamping device 200 further includes a photoelectric detector 80, a ram position detection member 70, and a ram position control member 90.

Figure 7:
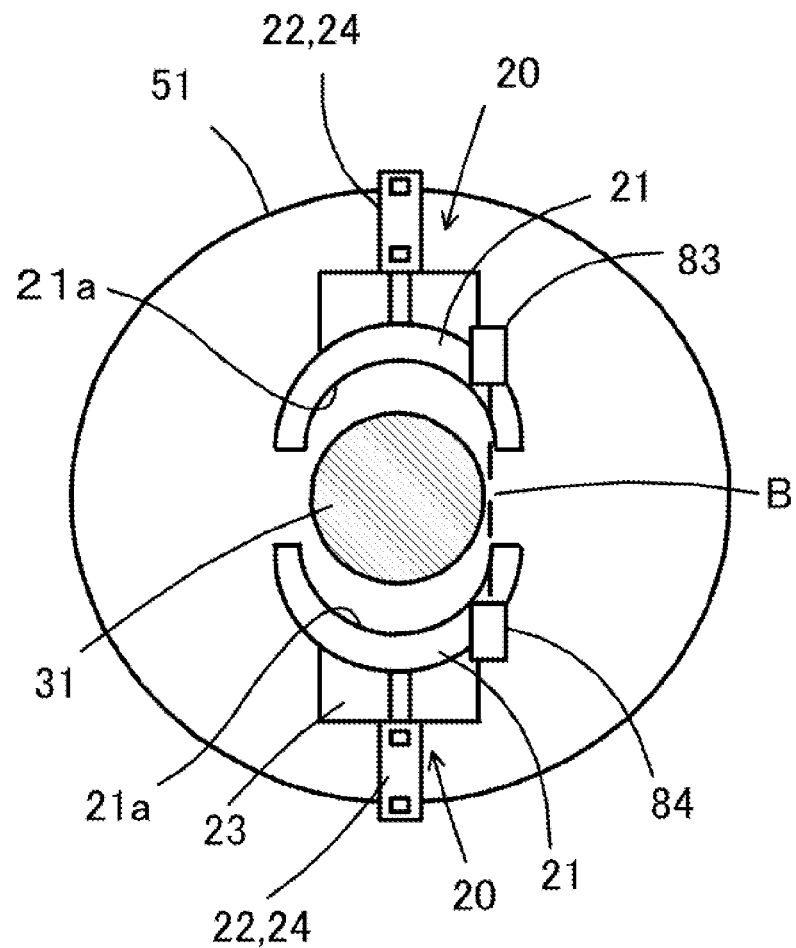
FIG. 7 is a schematic view showing a positional relationship between annular convex parts 31a, half nuts 21, and a detection optical axis B of a photoelectric detector 80 in a process of performing mold thickness adjustment in the mold clamping device 200 of the above embodiment.
Figure 8:
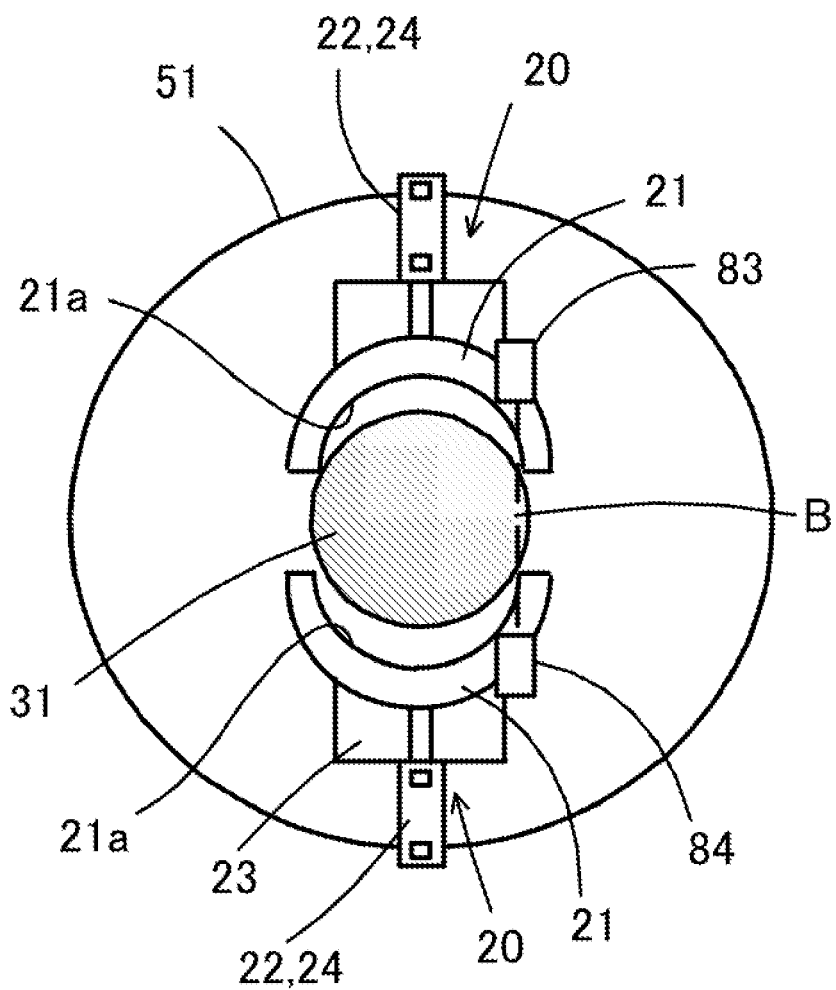
FIG. 8 is a schematic view showing a positional relationship between the annular convex parts 31a, the half nuts 21, and the detection optical axis B of the photoelectric detector 80 in a process of performing mold thickness adjustment in the mold clamping device 200 of the above embodiment.

FIG. 7 and FIG. 8 are schematic views showing a positional relationship between the annular convex parts 31a, the half nuts 21, and a detection optical axis B of the photoelectric detector 80 in a process of performing mold thickness adjustment in the mold clamping device 200 of the above embodiment. FIG. 7 shows a case in which the annular convex parts 31a do not block the detection optical axis B, and FIG. 8 shows a case in which the annular convex parts 31a block the detection optical axis B.

The photoelectric detector 80 detects that the annular convex parts 31a have approached a predetermined position and is composed of a light projecting element 83 which outputs light, a light receiving element 84 which detects light from the light projecting element 83, and a bracket 82. As shown in the figure, the light projecting element 83 and the light receiving element 84 are arranged at front ends of peripheral edges of the teeth 21a of the half nuts 21 and 21.

In mold thickness adjustment to be described later, the photoelectric detector 80 outputs light from the light projecting element 83 to the light receiving element 84 while the mold clamping ram 51 is advancing, and detects a position of the annular convex part 31a of the mold clamping shaft 31. Specifically, when the mold clamping ram 51 advances with the half nuts 21 opened, the position of the annular convex part 31a may be detected by a corner angle of the annular convex part 31a crossing the detection optical axis B.

Figure 9:
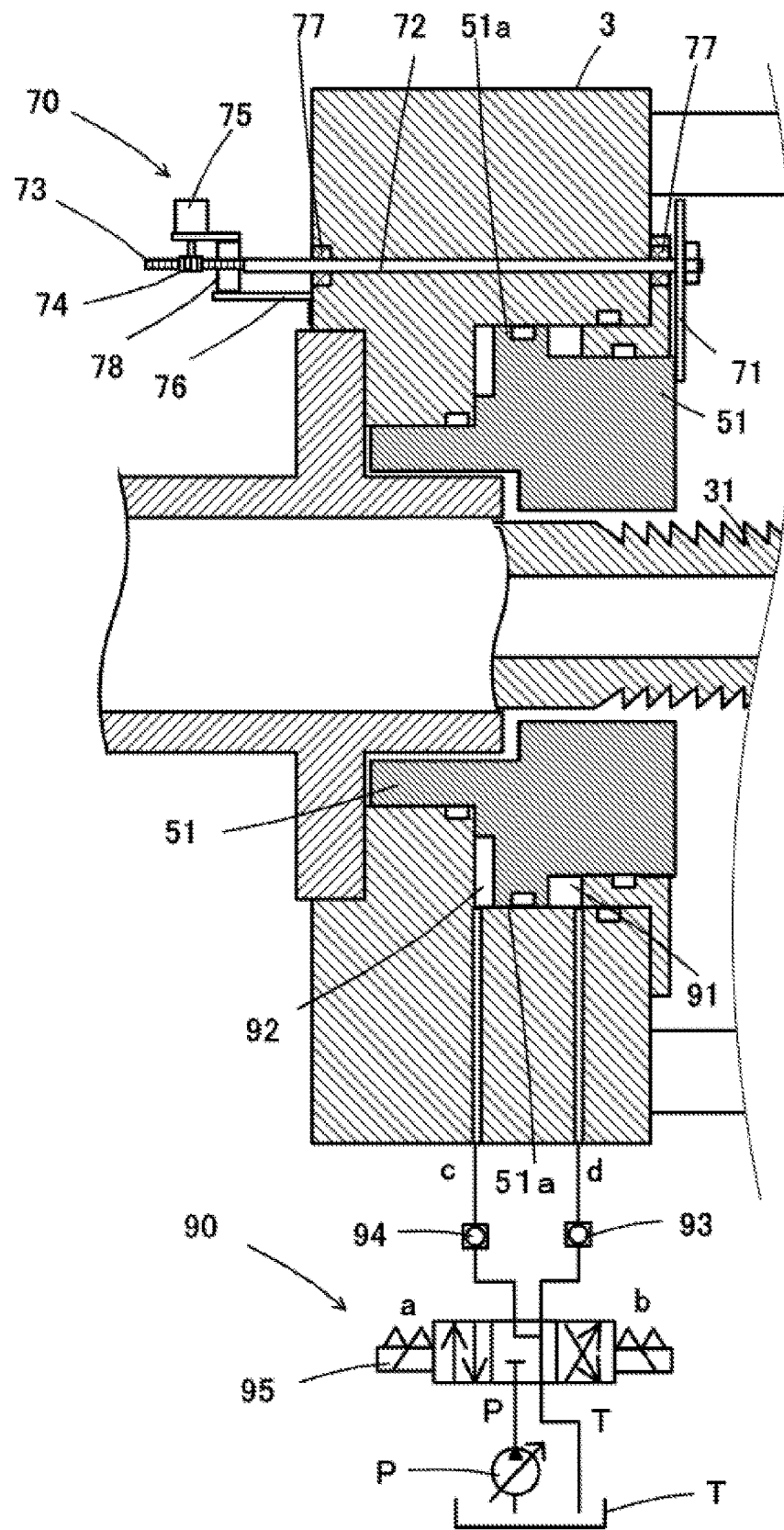
FIG. 9 is a schematic view showing a ram position detection member 70 and a ram position control member 90 of the above embodiment.

FIG. 9 is a schematic view showing the ram position detection member 70 and the ram position control member 90 of the above embodiment.

As shown in FIG. 9, the ram position detection member 70 is attached between the support platen 3 and the mold clamping ram 51. The ram position detection member 70 is composed of a rotary encoder 75 fixed to a back surface of the support platen 3 by a bracket 76, a pinion 74 fixed to a detection shaft of the rotary encoder 75, a connecting member 71 fixed to a front end surface of the mold clamping ram 51, an operating rod 72 connected to the connecting member 71 and attached to be movable in the front-rear direction through the support platen 3, and a rack 73 which is coaxially fixed to a tip end of the operating rod 72 and engages with the pinion 74. With the ram position detection member 70, a position in the front-rear direction of the mold clamping ram 51 which advances and retreats with respect to the support platen 3, i.e., a position in the front-rear direction of the half nut device 20, is detected by using the rotary encoder 75 as a position at which the rack 73 advances and retreats. Reference numeral 77 is a sliding bearing of the operating rod 72, and reference numeral 78 is a bearing of the rack 73.

The ram position control member 90 is a member which moves the mold clamping ram 51 with respect to the support platen 3 by using a hydraulic force and is connected to hydraulic lines c and d communicating with the mold opening oil chamber 91 and the mold clamping oil chamber 92 in front of and behind the piston part 51a of the mold clamping ram 51. The ram position control member 90 is a hydraulic control part including at least a directional control valve 95, a check valve 94 provided at the hydraulic line c, a check valve 93 provided at the hydraulic line d, a hydraulic pump P which supplies a hydraulic operating oil to the directional control valve 95, and a hydraulic tank T. Herein, the hydraulic pump P is a pump capable of variably controlling a discharge pressure and a flow rate. Further, the directional control valve 95 is a four-port three-position switching valve of double solenoids a and b, and an intermediate position thereof is a control valve in which only a P port from the hydraulic pump P is blocked. The check valves 93 and 94 are valves in which a check valve opens due to an external pilot pressure, and a pilot piping is provided so that hydraulic oils in the hydraulic lines c and d of each of the two check valves are supplied to each other as an external pilot pressure for the other check valve. In the ram position control member 90, a pump pressure and a pump flow rate of the hydraulic pump P during operation of the mold clamping ram 51 are detected.

(1.3 Configuration of Injection Device 300)

Figure 10:
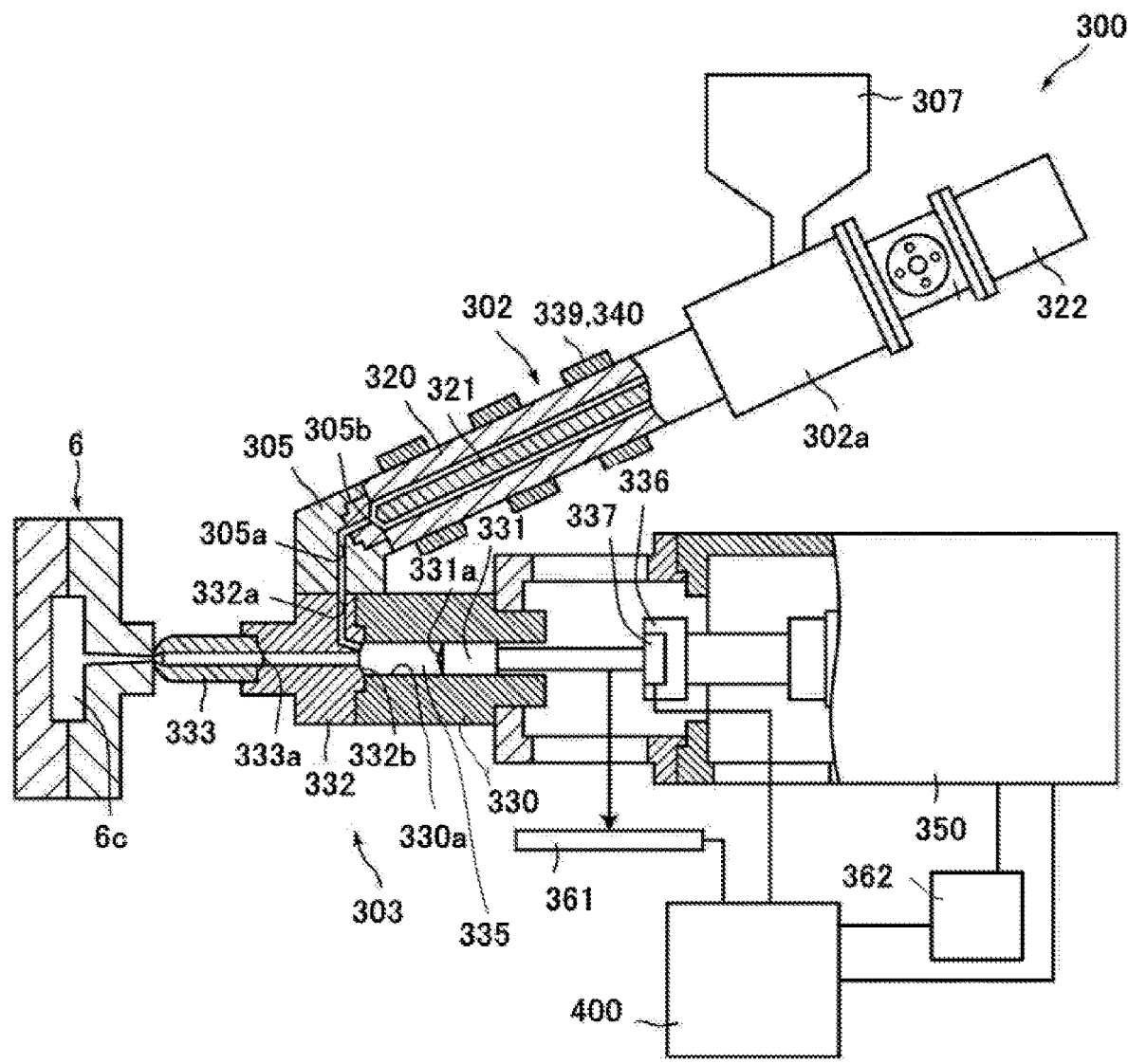
FIG. 10 is a schematic view showing an injection device 300 of the above embodiment.
Figure 11:
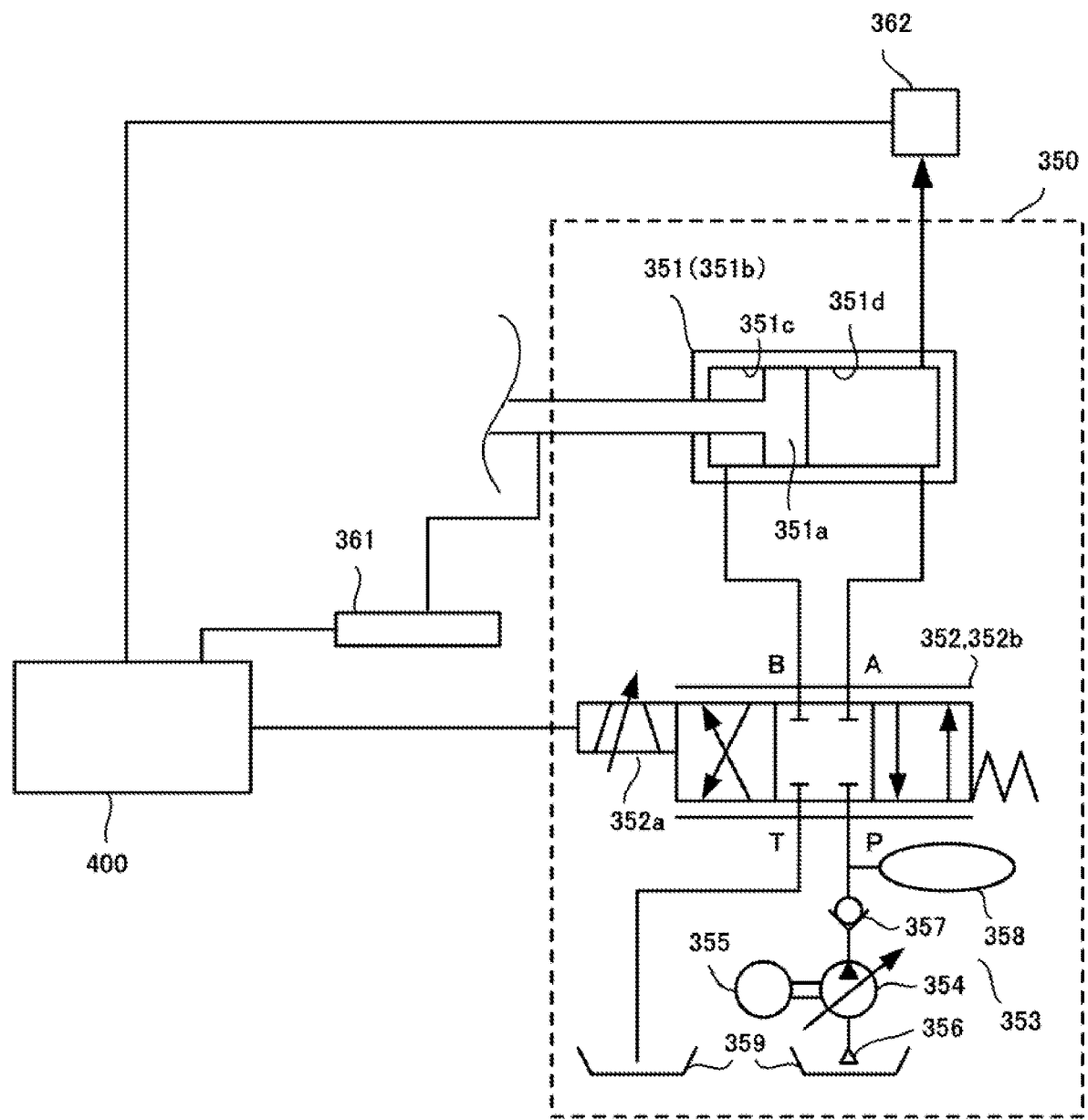
FIG. 11 is a schematic view showing a structure (hydraulic type) of an injection plunger driving device 350 of the above embodiment.

FIG. 10 is a schematic configuration view showing the injection device 300 of the above embodiment, and FIG. 11 is a schematic view showing a structure (hydraulic type) of an injection plunger driving device 350 of the above embodiment.

The injection device 300 includes a plasticization unit 302 which plasticizes a molding material, an injection unit 303 which injects the plasticized molding material supplied from the plasticization unit 302 into a cavity space 6c of the mold 6, and a communication member 305 which communicates the plasticization unit 302 and the injection unit 303.

As shown in FIG. 10, the plasticization unit 302 includes a plasticization cylinder 320, a plasticization screw (screw) 321 in the plasticization cylinder 320, and a rotation driving device 322 which rotates the plasticization screw 321. Further, a hopper 307 is provided to supply the resin material from a rear end side of the plasticization cylinder 320. A material discharge port of the hopper 307 and a material supply port of the plasticization cylinder 320 are communicated with each other by an inner hole of a hopper attachment member 302a. The inside of the plasticization cylinder 320 of the plasticization unit 302 communicates with an injection chamber 335 of the injection unit 303 via a communication passage 305a of the communication member 305.

Further, a heating device 339 (hereinafter simply referred to as a heater) such as a band heater is provided on an outer periphery of the plasticization cylinder 320, an injection cylinder 330, a nozzle cylinder 332, the communication member 305, an injection nozzle 333, and the like. For convenience of illustration, FIG. 10 shows a state in which the heater 339 is wound around the plasticization cylinder 320, but the heater 339 is also wound around the injection cylinder 330, the nozzle cylinder 332, the communication member 305, and the injection nozzle 333.

The plasticization cylinder 320 is divided into a plurality of zones and heated by the heater 339, and a temperature of each zone of the plasticization cylinder 320 is detected by a temperature detector 340 such as a thermocouple.

When the plasticization screw 321 is rotated in the plasticization cylinder 320 by the rotation driving device 322, the resin material supplied from the hopper 307 is melted by the heat applied from the heater 339 and the shearing heat.

The injection unit 303 includes an injection cylinder 330, an injection plunger (plunger) 331 in an injection cylinder hole 330a of the injection cylinder 330, an injection plunger driving device 350 which retreats the injection plunger 331, and an injection nozzle 333 attached to a front end of the injection cylinder 330 via the nozzle cylinder 332. A front wall 332b having a shape substantially the same as a tip end surface 331a of the injection plunger 331 is formed on an end surface of the nozzle cylinder 332 on the injection cylinder 330 side. An injection chamber 335 is formed as a space surrounded by the front wall 332b, the injection cylinder hole 330a of the injection cylinder 330, and the tip end surface 331a of the injection plunger 331. Then, in the injection chamber 335, a communication passage 332a which communicates with the inside of the plasticization cylinder 320 via the communication passage 305a of the communication member 305 and an injection hole 333a which communicates until a tip end of the injection nozzle 333 are opened.

The injection unit 303 includes an injection plunger driving device 350 which advances and retreats the injection plunger 331, a position detection device 361 which detects a position of the injection plunger 331, a pressure detection device 362 for detecting a pressure of the molding material in the injection cylinder 330, and a control device 400 which controls the injection plunger driving device 350.

The injection plunger driving device 350 of the injection unit 303 shown in FIG. 11 shows an example of a configuration of a case in which the injection plunger 331 is hydraulically driven.

The injection plunger driving device 350 is a device for retreating the injection plunger 331, and the injection plunger 331 and a driving rod of the injection plunger driving device 350 are coupled by a coupling 336.

The injection plunger driving device 350 includes a hydraulic cylinder 351 composed of a piston 351a and a cylinder 351b, a servo valve 352, a hydraulic supply source 353, and an oil tank 359. The hydraulic supply source 353 includes a hydraulic pump 354, a pump motor 355 which drives the hydraulic pump 354, a filter 356 connected to a suction side of the hydraulic pump 354, a check valve 357 which is connected to a discharge side of the hydraulic pump 354 and allows only a flow in a discharge direction, and an accumulator 358 connected to a discharge side of the check valve 357. In the injection plunger driving device 350 which drives the injection plunger 331 by the hydraulic cylinder 351, the accumulator 358 is provided in addition to the hydraulic pump 354 as the hydraulic supply source 353 to supply the hydraulic oil accumulated at a large amount and a high pressure in the accumulator 358 to the hydraulic cylinder 351 at once, and thereby the injection plunger 331 may be driven at a high speed, and also, the servo valve 352 is arranged between the accumulator 358 and the hydraulic cylinder 351, and by controlling the driving of the servo valve 352, a supply amount and a supply direction of the hydraulic oil to the hydraulic cylinder 351 may be adjusted to drive the injection plunger 331 with high response and high precision.

The servo valve 352 is a four-port servo valve having A, B, P and T ports. The A port is connected to a rear oil chamber 351d (piston head side oil chamber) of the hydraulic cylinder 351, the B port is connected to a front oil chamber 351c (piston rod side oil chamber), the P port is connected to the accumulator 358, and the T port is connected to the oil tank 359. In the servo valve 352, the A, B, P, and T ports are formed in a cylindrical sleeve, a spool 352b displaced in an axial direction is housed inside therein, and by moving a position of the spool 352b, the connection between the ports is switched, an opening degree of an opening of each port (hereinafter referred to as a spool opening degree) is changeable to adjust a flow rate, and the opening of each port is closed to block the port. The spool opening degree is controlled so as to be directly proportional to a voltage value which is a command signal (hereinafter referred to as a command value Qr) outputted from the control device 400 and inputted to a command value input part 352a of the servo valve 352. Depending on the configuration of the injection device 300, the spool opening degree may also be controlled so as to be directly proportional to a current value instead of a voltage value.

For example, in the four-port servo valve shown in FIG. 11, when the voltage value which is the command value Qr is zero, the spool 352b is at a neutral position. When the voltage value is positive, the P port is connected to the A port and the hydraulic oil is supplied from the hydraulic supply source 353 to the rear oil chamber 351d of the hydraulic cylinder 351, and also, the T port is connected to the B port, and the hydraulic oil in the front oil chamber 351c of the hydraulic cylinder 351 is returned to the oil tank 359. Further, when the voltage value is negative, the P port is connected to the B port, and the hydraulic oil is supplied from the hydraulic supply source 353 to the front oil chamber 351c of the hydraulic cylinder 351, and also, the T port is connected to the A port, and the hydraulic oil in the rear oil chamber 351d of the hydraulic cylinder 351 is returned to the oil tank 359. As the voltage value which is the command value Qr is reduced from zero in the negative direction, i.e., as an absolute value of the negative voltage value is increased, the spool opening degree increases so that a flow rate of the hydraulic oil per unit time flowing from the hydraulic supply source 353 to the front oil chamber 351c of the hydraulic cylinder 351 increases, and a retreat speed of the injection plunger 331 increases. As in this embodiment, the voltage value is not always zero, and the voltage value may be on either the positive or negative side. Further, a movement direction of the spool 352b with respect to the positive voltage value and the negative voltage value may be opposite to the movement direction in this embodiment.

Further, a position of the spool 352b is detected as a spool monitor value.

The position detection device 361 is a sensor which detects an actual value of the position of the injection plunger 331, and various position detection sensors such as a linear encoder may be adopted.

The pressure detection device 362 is a sensor for detecting a pressure (resin pressure) of the molding material applied to the injection plunger 331, and may be a pressure sensor or the like attached to a part of a cavity space in the mold, such as a load cell clamped between the injection plunger 331 and the piston rod, a pressure sensor attached to a tip end of the injection plunger 331, and the like.

(1.4 Configuration of Control Device 400)

Figure 12:
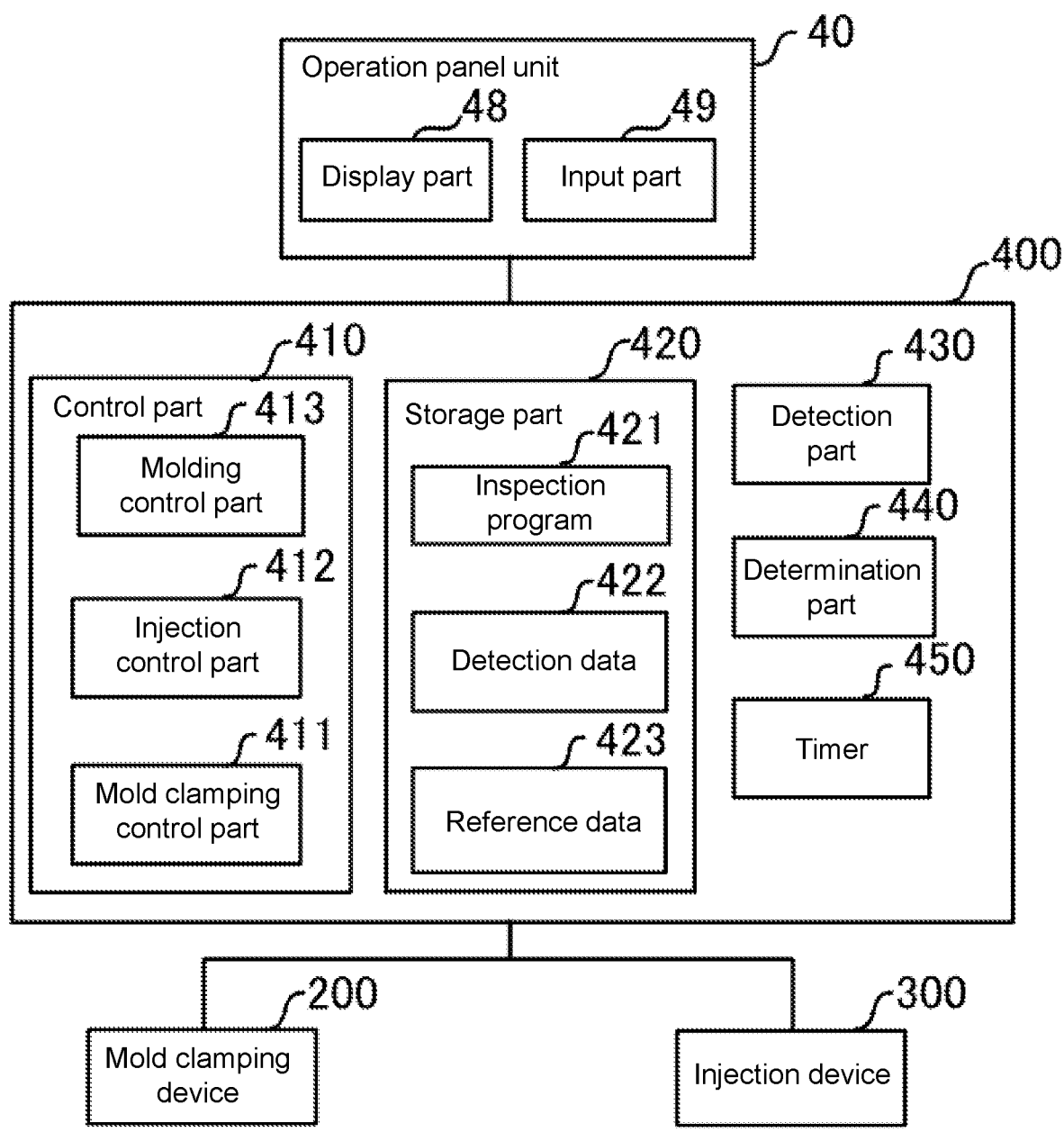
FIG. 12 is a block diagram showing a configuration of a control device 400 of the above embodiment.

FIG. 12 is a block diagram showing a configuration of the control device 400 of the above embodiment.

The control device 400 performs overall control on the injection molding machine 100, and is composed of, for example, a computer or a microcomputer having an arithmetic processing part such as a CPU and a memory. The control device 400 performs overall operation control based on a program stored in a storage part 420 and an input signal from the outside.

The control device 400 includes a control part 410, a storage part 420, a detection part 430, a determination part 440, and a timer 450.

The control part 410 is composed of a mold clamping control part 411, an injection control part 412, and a molding control part 413.

The mold clamping control part 411 is a control part which controls an overall operation of the mold clamping device 200, advances and retreats the movable platen 4 together with the movable-side mold 6a to open and close the mold, and further, in a mold step, performs driving control on the components of the mold clamping device 200 so as to increase the pressure to a predetermined mold clamping force after the closed molds 6a and 6b are brought into close contact with each other.

The injection control part 412 is a control part which controls an operation of the injection device 300 and performs driving control on the components of the injection device 300 such as the heater 339, the plasticization screw 321, and the injection plunger 331.

The molding control part 413 is a control part which performs overall control on the injection molding machine 100, and controls the mold clamping device 200 and the injection device 300 by the mold clamping control part 411 and the injection control part 412 to perform molding of a molded product in an order of mold closing and mold clamping, injection, pressure holding, cooling, metering, mold opening, protrusion, and removal.

The storage part 420 includes, for example, an SSD, a ROM, a RAM, a hard disk, and the like, stores various programs and data, and is installed with dedicated software in addition to basic software such as an operating system.

The storage part 420 includes an inspection program 421, a detection data 422, and a reference data 423.

The inspection program 421 is an application program for controlling the operation of the injection molding machine 100. Specific examples include a metering purge operation program 4211 which combines metering and purging, a mold thickness adjustment operation program 4212 which adjusts a mold clamping position of the mold clamping device 200, a temperature increase operation program 4213 which increases a temperature of the plasticization cylinder 320, and a mold opening/closing and protrusion operation program 4214 which performs an opening/closing operation on the mold 6 and a protrusion operation by the eject mechanism 37.

The detection data 422 is a data which stores detection values of various sensors and the like when the mold clamping device 200 and the injection device 300 are driven according to the inspection program 421, and the detection data 422 is stored in a file format or the like.

The reference data 423 is a data which serves as a determination reference when identifying a defective spot, and at the time of shipment, at the time of periodic inspection, after replacement of consumables, etc., the mold clamping device 200 and the injection device 300 are driven according to the inspection program 421, and detection values detected by each sensor are stored as the reference data 423. The reference data 423 is initialized and reacquired at the time of shipment, at the time of periodic inspection, at the time of replacement of consumables, etc.

The detection part 430 detects an operation of each component of the injection molding machine 100 when the injection molding machine 100 is driven according to the inspection program 421, and detection values are stored to the detection data 422 or the reference data 423.

The detection part 430 detects at least two types of the detection data 422 and the reference data 423 in order for the determination part 440 to perform determination at high accuracy.

The determination part 440 identifies a worn or deteriorated spot of the injection molding machine 100, and may use a plurality of types of data among the reference data 423 and the detection data 422 to detect a spot at which wearing or deterioration of a component has occurred.

The timer 450 measures the time, and measurement such as time measurement is performed using the timer 450.

(2. Inspection Process)

Figure 13:
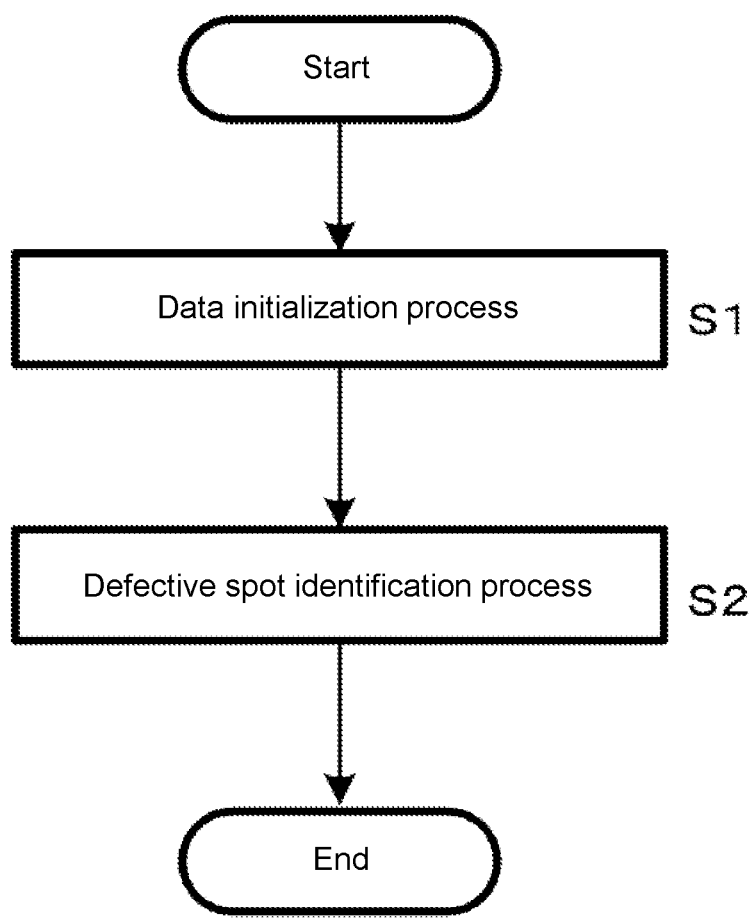
FIG. 13 is a flowchart showing a flow of an inspection process of the injection molding machine 100 of the above embodiment.

FIG. 13 is a flowchart showing a flow of an inspection process of the injection molding machine 100 of the above embodiment.

Herein, the inspection process of the injection molding machine 100 of the disclosure will be described below.

The inspection process of the disclosure is composed of a data initialization process (S1) which drives the injection molding machine 100 according to the inspection program 421 and stores detection values detected by each sensor to the reference data 423, and a defective spot identification process (S2) which drives the injection molding machine 100 according to the inspection program 421 and detects a spot at which wearing or deterioration of a component has occurred based on the reference data 423 and detection values of each sensor.

In other words, in the inspection process of the disclosure, the reference data 423 is acquired by driving the injection molding machine 100 in an ideal state such as at the time of shipment, periodic inspection, or replacement of consumables according to the inspection program 421, and is used as a determination reference value when identifying a defective spot.

(2.1 Data Initialization Process)

Figure 14:
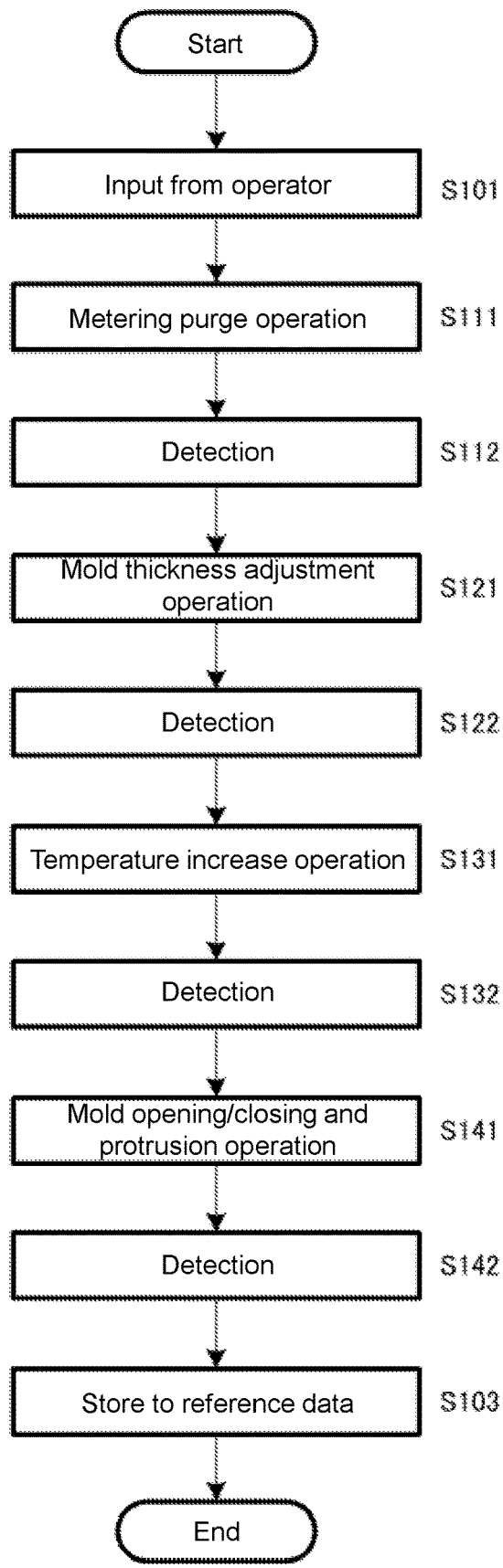
FIG. 14 is a flowchart showing a flow of a data initialization process of the injection molding machine 100 of the above embodiment.

FIG. 14 is a flowchart showing a flow of the data initialization process of the injection molding machine 100 of the above embodiment.

The data initialization process is a process which drives the injection molding machine 100 according to the inspection program 421 at the time of shipment, periodic inspection, or replacement of consumables to acquire and store the reference data 423.

The data initialization process includes an input step (S101) of an operator, an inspection program execution step (S102), and a storage step (S103).

On a setting screen displayed on the display part 48 of the operation panel unit 40, a menu or the like for performing the data initialization process is displayed, and as the operator selects the data initialization process by the input part 49, the data initialization process is started (S101: input step).

When the data initialization process is selected from the input part 49, the control part 410 drives the mold clamping device 200 and the injection device 300 according to the inspection program 421 (S102: inspection program execution step) and stores each detection value to the reference data 423 (S103: storage step).

As a specific example of the inspection program execution step, a process in the case of sequentially executing the metering purge operation program 4211, the mold thickness adjustment operation program 4212, the temperature increase operation program 4213, and the mold opening/closing and protrusion operation program 4214 will be described.

The order in which the inspection program 421 is executed is not limited to the above. It is also possible for the operator to individually select and execute each inspection program 421 from the setting screen, and a menu combining a plurality of inspection programs 421 may also be displayed on the setting screen and executed. When the operator selects a menu combining a plurality of inspection programs 421, the control part 400 continuously executes the inspection programs 421. Further, the inspection program 421 is not limited to the above.

(2.2 Metering Purge Operation Step)

The injection control part 412 drives the injection device 300 according to the metering purge operation program 4211 to perform the metering purge operation. Specifically, the injection control part 412 moves the molten resin inside the plasticization cylinder 320 of the injection device 300 into the injection cylinder 330 while rotating the plasticization screw 321, and performs metering while retreating the injection plunger 331. Afterwards, as the injection plunger 331 comes to a position of an injection stroke, the plasticization screw 321 is advanced to close the communication passage 305b, and in this state, the injection plunger 331 is advanced to perform a purge operation which discharges the molten resin in the injection cylinder 330 (S111).

During the metering operation and the purge operation, at a set time interval H5, the detection part 430 sequentially detects a position of the injection plunger 331 by the position detection device 361, and sequentially detects a pressure (resin pressure) of the molten resin applied to the injection plunger 331 by the pressure detection device 362. Further, the position of the spool 352b of the injection plunger driving device 350 is detected as a spool monitor value (S112).

The detection part 430 stores the resin pressure, the injection plunger position, and the spool monitor value at the set time interval H5 to the storage part 420. Specifically, when the above detection values are detected in the data initialization process, the above detection values are stored to the reference data 423 together with a detection time respectively as a reference resin pressure 461a, a reference injection plunger position 462a, and a reference spool monitor value 464a (S103). When detected in the defective spot identification process, the above detection values are stored to the detection data 422 together with a detection time as a resin pressure 461b, an injection plunger position 462b, and a spool monitor value 464b (S203).

(2.3 Mold Thickness Adjustment Operation Step)

The mold clamping control part 411 drives the mold clamping device 200 according to the mold thickness adjustment operation program 4212 to perform the mold thickness adjustment operation.

Specifically, with the mold attached to the fixed platen 2 and the movable platen 4, the mold clamping control part 411 drives the servomotor 11 fixed to the support platen 3 to rotate the mold opening/closing screw shaft 41 and advance the mold clamping shaft 31, and then, advances the movable platen 4 toward the fixed platen 2 to perform mold closing. The half nut 21 is opened by the air cylinder 22.

Then, the mold clamping control part 411 excites the solenoid b of the directional control valve 95 to open the mold clamping oil chamber 92 to the hydraulic tank T side, and supplies low-pressure hydraulic oil to the mold opening oil chamber 91 to retreat the mold clamping ram 51 to a retreat limit position. Afterwards, the mold clamping control part 411 excites the solenoid a of the directional control valve 95 and supplies low-pressure and low-flow hydraulic oil from the hydraulic pump P to the mold clamping oil chamber 92, and opens the mold opening oil chamber 91 to the hydraulic tank T side and slowly advances the mold clamping ram 51 from the retreat limit position to an advance limit position with a weak thrust.

Afterwards, a position of the annular convex part 31a is detected by the photoelectric detector 80 and stopped. Finally, the half nut 21 is closed by the air cylinder 22 to perform the mold clamping operation (S121).

During the mold thickness adjustment operation, the detection part 430 detects a mold clamping pressure, a detection value of the ram position detection member 70, a pump pressure of the hydraulic pump P, and a pump flow rate at a set time interval H4 based on the timer 450. Further, an output signal of the air valve 24 of the half nut device 20, input values of the engagement sensors 22a and 22b of the air cylinders 22 and 22, and an input value of the photoelectric detector 80 are detected (S122).

The detection part 430 stores the mold clamping pressure, the position of the mold clamping ram 51, the output signal of the air valve 24 of the half nut device 20, the pump pressure, the pump flow rate, the input signals of the engagement sensors 22a and 22b of the air cylinders 22 and 22, and the input signal of the photoelectric detector 80 to the storage part 420 together with a detection time. Specifically, when the above detection values are detected in the data initialization process, the above detection values are stored to the reference data 423 together with a detection time as a reference mold clamping pressure 471a, a reference position 472a of the mold clamping ram 51, a reference output signal 473a of the air valve 24 of the half nut device 20, a reference pump pressure 474a, a reference pump flow rate 475a, reference input signals 476a and 478a of the engagement sensors 22a and 22b of the air cylinders 22 and 22, and a reference input signal 477a of the photoelectric detector 80 (S103). Further, when detected in the defective spot identification process, the detection values are stored to the detection data 422 together with a detection time as a mold clamping pressure 471b, a position 472b of the mold clamping ram 51, an output signal 473b of the air valve 24 of the half nut device 20, a pump pressure 474b, a pump flow rate 475b, input signals 476b and 478b of the engagement sensors 22a and 22b of the air cylinders 22 and 22, and an input signal 477b of the photoelectric detector 80 (S203).

(2.4 Temperature Increase Operation Step)

The injection control part 412 drives the injection device 300 and heats the plasticization cylinder 320 according to the temperature increase operation program 4213 to perform the temperature increase operation. Specifically, the injection control part 412 maintains the plasticization cylinder 320, into which the resin material has not been supplied, at a set temperature T1, and then heats the plasticization cylinder 320 to a set temperature T2 (T1<T2) (S131).

During the temperature increase operation, the detection part 430 detects a detection value of the temperature detector 340 and measures a time from the set temperature T1 to the set temperature T2 (S132).

The detection part 430 detects temperatures of each zone of the plasticization cylinder 320 at a predetermined time interval H11 and stores the temperatures to the storage part 420. Specifically, when the above detection value is detected in the data initialization process, the detection value is stored to the reference data 423 together with a detection time as a reference zone temperature 481*a* (S103). When detected in the defective spot identification process, the above detection value is stored to the detection data 422 together with a detection time as a zone temperature 481*b* (S203).

(2.5 Mold Opening/Closing and Protrusion Operation Step)

The mold clamping control part 411 drives the mold clamping device 200 to perform the mold opening/closing operation and the protrusion operation according to the mold opening/closing and protrusion operation program 4214. Specifically, the mold clamping control part 411 advances and retreats the movable platen 4 to open and close the mold, and at the time of mold opening, drives the servomotor 37*a* to operate the protrusion shaft 37*c* to perform the protrusion operation (S141).

During the mold opening/closing operation, the detection part 430 detects a position of the movable platen 4 in the front-rear direction by the encoder 111 built in the servomotor 11, and detects a position of the protrusion shaft 37*c* by the encoder 37*d*. Further, torque data of the servomotor 11 and the servomotor 37*a* are collected (S142).

The detection part 430 stores a position of the movable platen 4, a position of the protrusion shaft 37*c*, a torque data of the servomotor 11, and a torque data of the servomotor 37*a* to the storage part 420 at a predetermined time interval H14. Specifically, when the above detection values are detected in the data initialization process, the above detection values are stored to the reference data 423 together with a detection time as a reference position 491*a* of the movable platen 4, a reference position 492*a* of the protrusion shaft 37*c*, a reference torque data 493*a* of the servomotor 11, and a reference torque data 494*a* of the servomotor 37*a* (S103). Further, when detected in the defective spot identification process, the above detection values are stored to the detection data 422 together with a detection time as a position 491*b* of the movable platen 4, a position 492*b* of the protrusion shaft 37*c*, a torque data 493*b* of the servomotor 11, and a torque data 494*b* of the servomotor 37*a* (S203).

(2.6 Defective Spot Identification Process)

Figure 15:
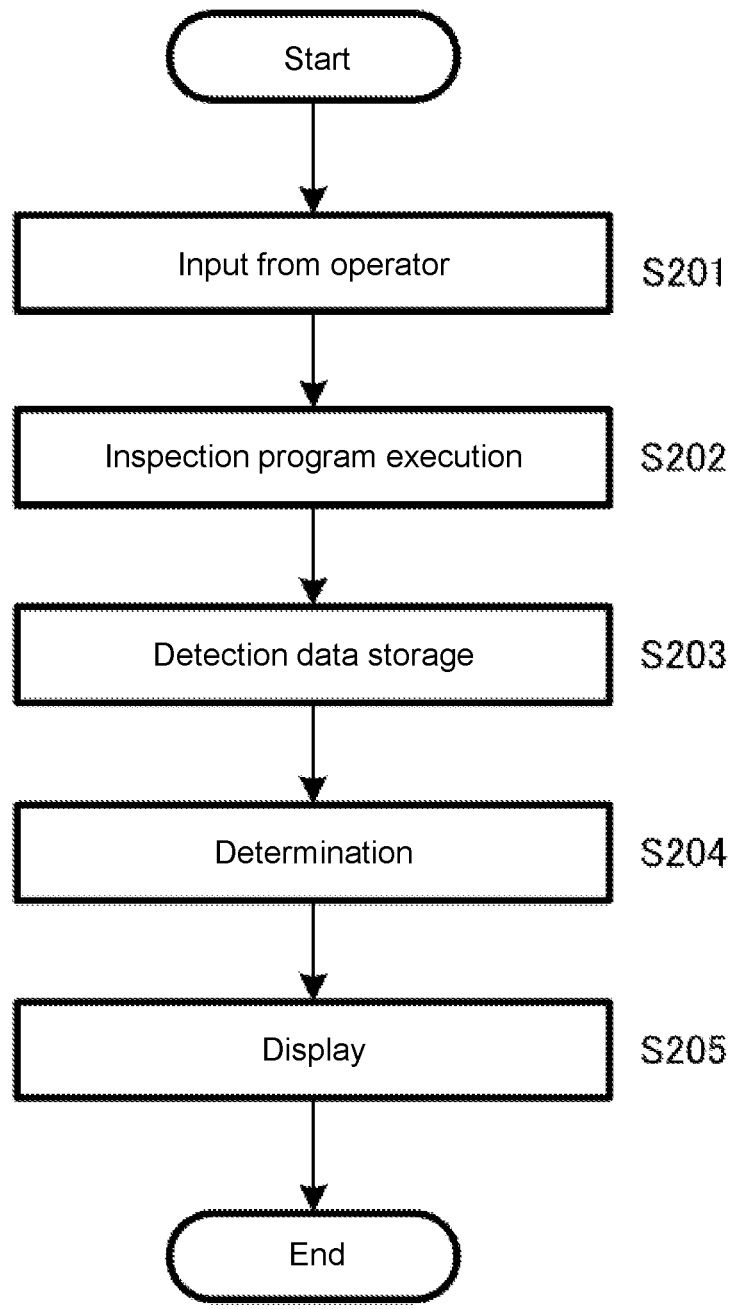
FIG. 15 is a flowchart showing a flow of a defective spot identification process of the injection molding machine 100 of the above embodiment.

FIG. 15 is a flowchart showing a flow of the defective spot identification process of the injection molding machine 100 of the above embodiment.

The defective spot identification process is a process used when performing periodic inspection of the injection molding machine 100 after shipment and when identifying a defective spot of the injection molding machine 100 in a case where a molding defect has occurred.

The defective spot identification process is composed of an input step (S201) of the operator, an inspection program execution step (S202), a storage step (S203), a determination step (S204), and a display step (S205).

When performing periodic inspection or identifying a defective spot, as the operator selects a menu for performing the defective spot identification process from a setting screen displayed on the display part 48 of the operation panel unit 40, the defective spot identification process is started (S201: input step).

The menu for performing the defective spot identification process may be configured so that each inspection program 421 may be individually selected, and a menu combining a plurality of inspection programs 421 may also be displayed on the setting screen and executed. When the operator selects the menu combining a plurality of inspection programs 421, the control part 400 continuously executes the inspection programs 421.

When the defective spot identification process is selected from the input part 49, the control part 410 drives the mold clamping device 200 and the injection device 300 according to the inspection program 421 (S202: inspection program execution step), stores each detection value to the detection data 422 (S203: storage step), and performs identification of a defective spot based on the reference data 423 stored at the time of shipment and the like and the detection data 422 (S204: determination step). The identified result is displayed on the display part 48 by a message or the like (S205: display step).

In the inspection program execution step (S202), the same steps as the metering purge operation step, the mold thickness adjustment operation step, the temperature increase operation step, and the mold opening/closing and protrusion operation step performed in the data initialization process are executed under the same setting conditions. Since the details of the inspection program execution step and the storage step (S203) are the same as in the data initialization process, descriptions thereof will be omitted.

In the determination step (S204), comparison is performed between the reference data stored in the data initialization process and the detection data stored in the defective spot identification process to identify the defective spot. Specific examples of a method of identifying a defective spot will be described below.

In the display step (S205), the determination result determined by the determination part 440 is displayed on the display part 48 by a message or the like to prompt the operator to replace and adjust the component.

(2.7 Determination Step in Metering Purge Operation)

An example of performing identification of a defective spot using the detection values detected in the metering purge operation will be described below.

Specific Example 1

The determination part 440 obtains a metering time T9 of the time of reference data acquisition based on the reference resin pressure 461*a* and the reference injection plunger position 462*a* of each detection time stored in the reference data 423. Similarly, a metering time T10 of a current time is obtained based on the resin pressure 461*b* and the injection plunger position 462*b* of each detection time stored in the detection data 422. Then, the metering time T9 of the time of reference data acquisition and the metering time T10 of the current time are compared, and it is determined whether the metering time T10 is increased by a predetermined value H1 or more with respect to the metering time T9. When the metering time T10 is increased by the predetermined value or more, it is determined that the plasticization screw 321 is worn.

Specific Example 2

Figure 16:
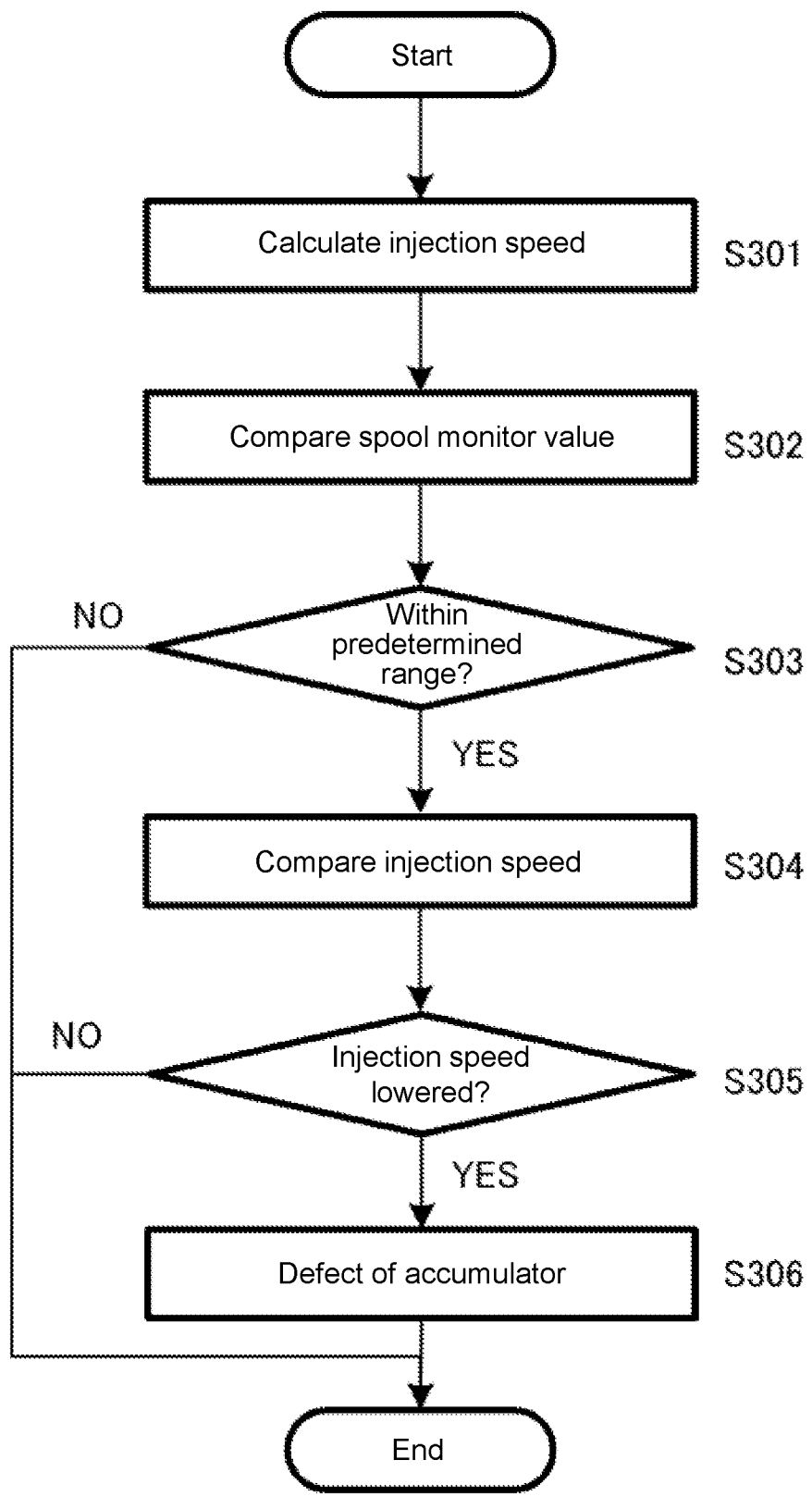
FIG. 16 is a flowchart showing a flow (specific example 2) of a determination step of the injection molding machine 100 of the above embodiment.

FIG. 16 is a flowchart showing a flow (specific example 2) of a determination step of the injection molding machine 100 of the above embodiment.

The determination part 440 obtains an injection speed V1 of the time of reference data acquisition based on the reference resin pressure 461a and the reference injection plunger position 462a of each detection time stored in the reference data 423. Similarly, an injection speed V2 of a current time is obtained based on the resin pressure 461b and the injection plunger position 462b of each detection time stored in the detection data 422 (S301).

The determination part 440 compares the reference spool monitor value 464a stored in the reference data 423 and the spool monitor value 464b stored in the detection data 422 and calculates a fluctuation amount of the spool monitor value 464b (S302). When the spool monitor value 464b is within a predetermined range H2 with respect to the reference spool monitor value 464a (S303), next, the injection speed V1 and the injection speed V2 are compared (S304). When the injection speed V2 is lowered to a predetermined value H3 or less with respect to the injection speed V1 (S305), it is determined that the bladder of the accumulator 358 is defective due to an insufficient charge pressure (S306).

(2.8 Determination Step in Mold Thickness Adjustment Operation)

An example of performing identification of a defective spot using the detection values detected in the mold thickness adjustment operation will be described below.

Specific Example 3

Figure 17:
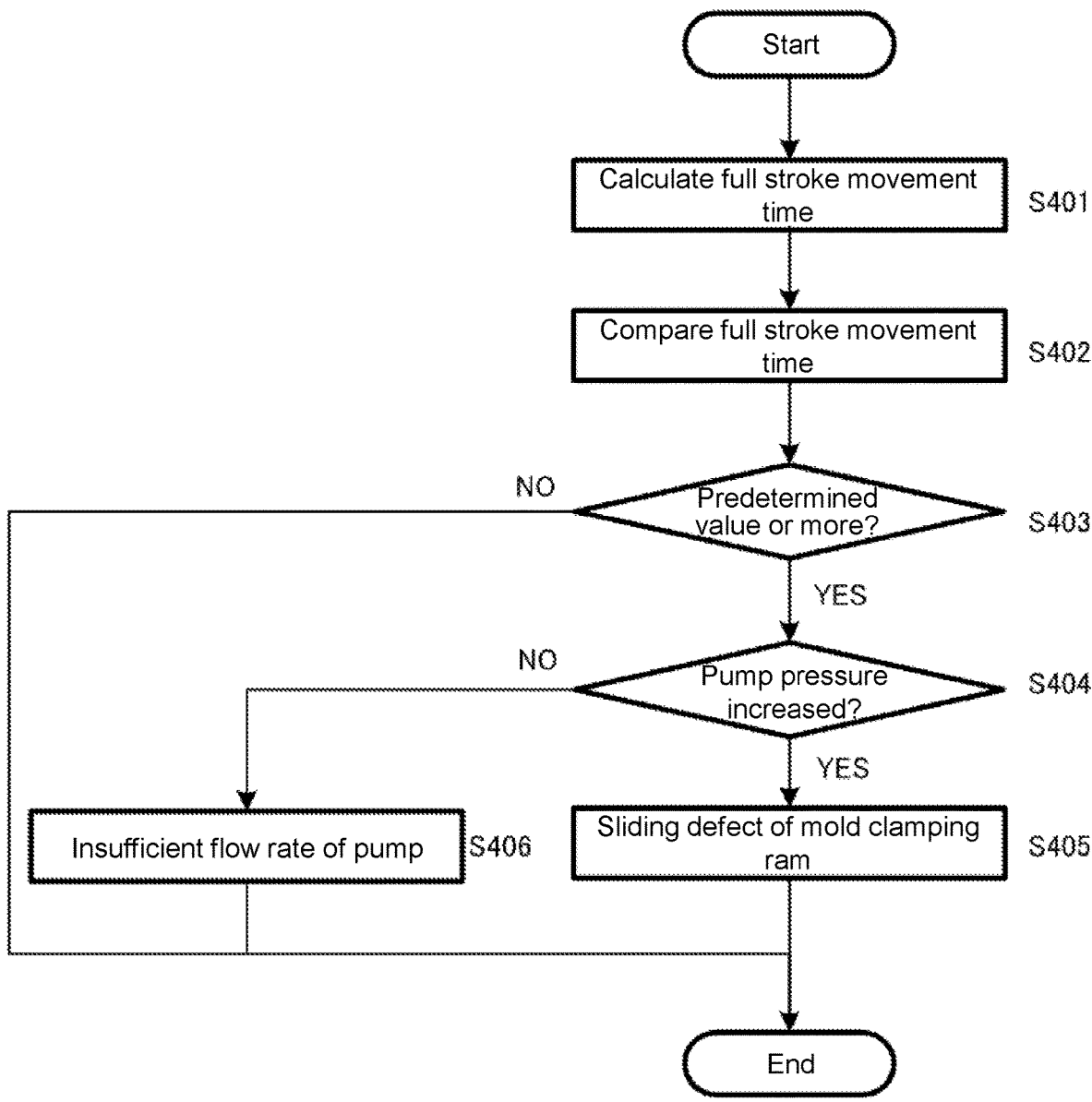
FIG. 17 is a flowchart showing a flow (specific example 3) of a determination step of the injection molding machine 100 of the above embodiment.

FIG. 17 is a flowchart showing a flow (specific example 3) of a determination step of the injection molding machine 100 of the above embodiment.

The determination part 440 calculates a full stroke movement time T3 at which the mold clamping ram 51 moves from a retreat limit position to an advance limit position based on the reference position 472a of the mold clamping ram 51 of each detection time stored in the reference data 423. Similarly, a full stroke movement time T4 at which the mold clamping ram 51 moves from the retreat limit position to the advance limit position is calculated based on the position 472b of the mold clamping ram 51 of each detection time stored in the detection data 422 (S401). Then, the full stroke movement time T3 of the time of reference data acquisition and the full stroke movement time T4 of the current time are compared (S402), and it is determined whether the full stroke movement time T4 is delayed by a predetermined value H6 or more with respect to the full stroke movement time T3 (S403). When the full stroke movement time T4 is delayed by the predetermined value H6 or more, the determination part 440 determines whether the pump pressure 474b is increased by a predetermined value H7 or more during movement of the mold clamping ram 51 from the retreat limit position to the advance limit position based the position 472b of the mold clamping ram 51 and the pump pressure 474b of each detection time stored in the detection data 422 (S404). When the pump pressure 474b is increased by the predetermined value H7 or more, it is determined that there is a sliding defect (galling) between the mold clamping ram 51 and the inner wall of the mold clamping cylinder hole 50 (S405). Further, when the pump pressure 474b is not increased by the predetermined value H7 or more, it is determined that the flow rate of the hydraulic pump P is insufficient (S406).

Specific Example 4

The determination part 440 calculates a pump pressure PD1 at the retreat limit position and a pump pressure PU1 at the advance limit position of the mold clamping ram 51 of the time of reference data acquisition based on the reference position 472a of the mold clamping ram 51 and the reference pump pressure 474a of each detection time stored in the reference data 423. Similarly, a pump pressure PD2 at the retreat limit position and a pump pressure PU2 at the advance limit position of the mold clamping ram 51 are calculated based on the position 472b of the mold clamping ram 51 and the pump pressure 474b of each detection time stored in the detection data 422. Then, comparison is performed between the pump pressure PD1 and the pump pressure PD2 at the retreat limit position and the pump pressure PU1 and the pump pressure PU2 at the advance limit position, and if the pump pressure PD2 and the pump pressure PU2 are not increased respectively by predetermined values H8 and H9 or more, it is determined that the hydraulic pump P has a pressure loss (hydraulic leak).

Specific Example 5

The determination part 440 calculates an operation time T5 of the time of reference data acquisition from a state in which the half nut 21 retreats and engagement with the mold clamping shaft 31 is released to a state in which the half nut 21 advances and engages with the mold clamping shaft 31 based on the reference input signals 476a and 478a of the engagement sensors 22a and 22b of the air cylinders 22 and 22 stored in the reference data 423. Similarly, the determination part 440 calculates an operation time T6 of the current time from a state in which the half nut 21 retreats and engagement with the mold clamping shaft 31 is released to a state in which the half nut 21 advances and engages with the mold clamping shaft 31 based on the input signals 476b and 478b of the engagement sensors 22a and 22b of the air cylinders 22 and 22 stored in the detection data 422. Then, the operation time T5 of the time of reference data acquisition and the operation time T6 of the current time are compared, and it is determined whether the operation time T6 is delayed by a predetermined value H10 or more with respect to the operation time T5. When the operation time T6 is delayed by the predetermined value H10 or more, the determination part 440 determines that an air pressure of the air cylinders 22 and 22 is insufficient.

(2.9 Determination Step in Temperature Increase Operation)

An example of performing identification of a defective spot using the detection values detected in the temperature increase operation will be described below.

Specific Example 6

The determination part 440 calculates a temperature reaching time T7 of each zone in the case of increasing the temperature to a predetermined temperature H12 at the time of reference data acquisition based on the reference zone temperature 481a of each detection time stored in the reference data 423. Similarly, the determination part 440 calculates a temperature reaching time T8 of each zone in the case of increasing the temperature to the predetermined temperature H12 based on the zone temperature 481b of each detection time stored in the detection data 422. Then, the temperature reaching time T7 of the time of reference data acquisition and the temperature reaching time T8 of the current time are compared, and it is determined whether the temperature reaching time T8 is delayed by a predetermined value H13 or more with respect to the temperature reaching time T7. When the temperature reaching time T8 is delayed by the predetermined value H13 or more, it is determined that the heater 339 has deteriorated.

Specific Example 7

The determination part 440 determines whether the zone temperature 481b is appropriately increased in the case of performing temperature increase control on the heater 339 based on the zone temperature 481b of each detection time stored in the detection data 422. When the zone temperature 481b is not increased appropriately, it is determined that there is a failure in the heater 339.

(2.10 Determination Step in Mold Opening/Closing and Protrusion Operation)

An example of performing identification of a defective spot using the detection values detected in the mold opening/closing and protrusion operation will be described below.

Specific Example 8

Figure 18:
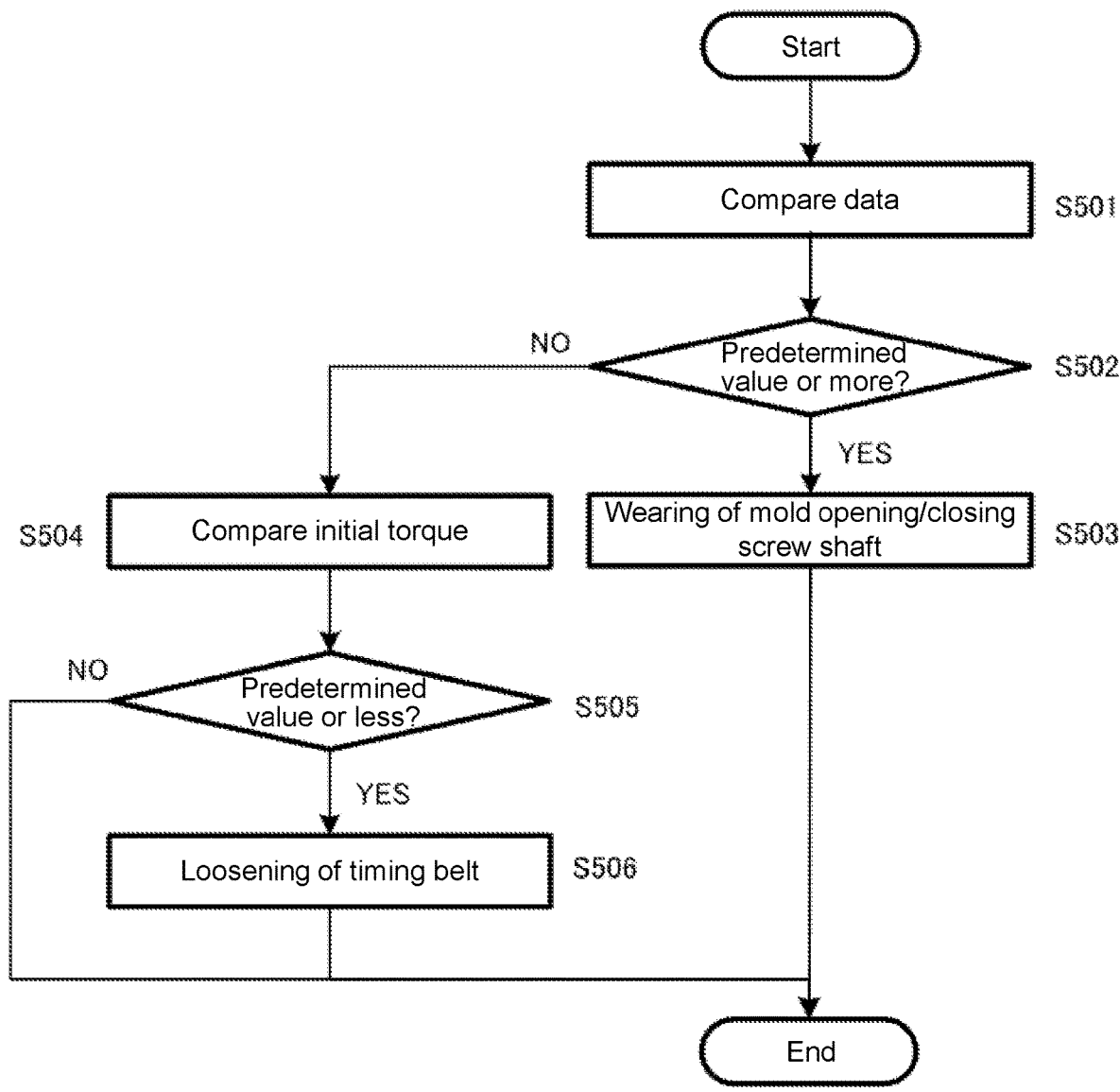
FIG. 18 is a flowchart showing a flow (specific example 8) of a determination process of the injection molding machine 100 of the above embodiment.

FIG. 18 is a flowchart showing a flow (specific example 8) of a determination process of the injection molding machine 100 of the above embodiment.

Based on the reference position 491a of the movable platen 4 and the reference torque data 493a of the servomotor 11 of each detection time stored in the reference data 423, and the position 491b of the movable platen 4 and the torque data 493b of the servomotor 11 stored in the detection data 422 (S501), when a fluctuation in the torque of the servomotor 11 is greater than a predetermined value H15 (S502), the determination part 440 determines that the mold opening/closing screw shaft 41 is worn (S503). Further, an initial torque at the start of rotation of the servomotor 11 immediately after the mold closing operation is ended and the mold opening operation is started is calculated and compared with the reference data 423, and when the initial torque is smaller than a predetermined value H16 (S504, S505), it is determined that the timing belt 14 is loosened (S506).

According to the same method, the determination part 440 determines wearing of the protrusion shaft 37c and loosening of the timing belt 37b based on the reference position 492a of the protrusion shaft 37c and the reference torque data 494a of the servomotor 37a of each detection time stored in the reference data 423, and the position 492b of the protrusion shaft 37c and the torque data 494b of the servomotor 37a stored in the detection data 422.

As described in detail above, by using the injection molding machine and the inspection program of the injection molding machine of the disclosure, even an operator who is unfamiliar with the maintenance of the equipment can quickly and easily perform an accurate deterioration diagnosis.

What is claimed is:

1. An injection molding machine, comprising:
a mold clamping device, comprising a movable platen;
an injection device, comprising an injection cylinder; a control device; and
a storage part, comprising a memory, configured to store an inspection program indicating an operation of the injection molding machine;
wherein the control device comprises a processor configured to function as:
a control part which executes the inspection program;
a detection part which acquires, as a reference data, a state of the injection molding machine when the injection molding machine is driven according to the inspection program at a time of shipment, periodic inspection, or replacement of consumables, and the detection part acquires, as a detection data, the state of the injection molding machine when the injection molding machine is driven according to the inspection program at another time different from the time; and
a determination part which identifies a deteriorated spot of the injection molding machine based on the detection data and the reference data,
wherein the detection part acquires:
at least two types or more of the reference data using the inspection program, including:
a first reference data; and
a second reference data;
at least two types or more of the detection data using the inspection program, including:
a first detection data; and
a second detection data;
wherein the inspection program that is used for acquiring the first detection data, the second reference data, and the second detection data is a same inspection program that is used for acquiring the first reference data,
wherein the first reference data and the first detection data are a same type, and the second reference data and the second detection data are a same type,
wherein the determination part is configured to perform a defective spot identification process by performing a plurality of comparisons including a first comparison and a second comparison, the first comparison compares the first detection data with the first reference data, and the second comparison compares the second detection data with the second reference data,
wherein the determination part is configured to identify the deteriorated spot based on a comparison result of the first comparison,
wherein the determination part is further configured to identify the deteriorated spot based on comparison results of both the first comparison and the second comparison jointly, wherein the defective spot identification process performs the second comparison only when a result of the first comparison is a predetermined result.

2. The injection molding machine according to claim 1, wherein the storage part stores a plurality of types of the inspection program, and the control part continuously executes the plurality of types of the inspection program in combination.

3. The injection molding machine according to claim 1, wherein the inspection program comprises a metering purge operation program which combines metering and purging in the injection device, and the detection data comprises a resin pressure applied to an injection plunger and a spool monitor value of an injection plunger driving device.

4. The injection molding machine according to claim 1, wherein the inspection program comprises a mold thickness adjustment operation program which adjusts a position of mold clamping of the mold clamping device, and the detection data comprises a position of a mold clamping ram of the mold clamping device and a pump pressure of a hydraulic pump for driving the mold clamping ram.

5. An inspection method of the injection molding machine according to claim 1, the inspection method comprising:

a first inspection program execution step which drives the injection molding machine according to the inspection program at the time of shipment, periodic inspection, or replacement of consumables to acquire the reference data;

a second inspection program execution step which drives the injection molding machine according to the inspection program to acquire the detection data;

a first storage step which stores the reference data including the first reference data and the second reference data;

a second storage step which stores the detection data including the first detection data and the second detection data; and a comparison step which perform the plurality of comparisons including the first comparison and the second comparison, the first comparison compares the first detection data with the first reference data, and the second comparison compares the second detection data with the second reference data, a determination step which identifies the deteriorated spot based on comparison results of both the first comparison and the second comparison.

6. The inspection method of the injection molding machine according to claim 5, wherein the inspection program execution step continuously executes a plurality of types of the inspection program in combination.

7. The inspection method of the injection molding machine according to claim 5, wherein the inspection method of the injection molding machine is composed of a data initialization process and a defective spot identification process, the defective spot identification process is composed of the inspection program execution step, the storage step, and the determination step, the data initialization process acquires and stores, as a reference data, a state of the injection molding machine when the injection molding machine is driven according to the inspection program at the time of shipment, periodic inspection, or replacement of consumables, and the determination step compares the reference data and the detection data to identify the deteriorated spot.

8. The inspection method of the injection molding machine according to claim 5, wherein the inspection program comprises a metering purge operation program which combines metering and purging in the injection device, and the detection data comprises a resin pressure applied to an injection plunger and a spool monitor value of an injection plunger driving device.

9. The inspection method of the injection molding machine according to claim 5, wherein the inspection program comprises a mold thickness adjustment operation program which adjusts a position of mold clamping of the mold clamping device, and the detection data comprises a position of a mold clamping ram of the mold clamping device and a pump pressure of a hydraulic pump for driving the mold clamping ram.

* * * * *